(12) United States Patent
Catalano et al.

(10) Patent No.: US 12,228,231 B2
(45) Date of Patent: Feb. 18, 2025

(54) PLUMBING CONNECTOR

(71) Applicant: RELIANCE WORLDWIDE CORPORATION, Atlanta, GA (US)

(72) Inventors: Joseph Derres Catalano, Roswell, GA (US); Sai Kishore Ravisankar, Alpharetta, GA (US)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 0 days.

(21) Appl. No.: 18/659,206

(22) Filed: May 9, 2024

(65) Prior Publication Data

US 2024/0288108 A1 Aug. 29, 2024

Related U.S. Application Data

(63) Continuation of application No. PCT/US2023/034177, filed on Sep. 29, 2023.

(60) Provisional application No. 63/377,921, filed on Sep. 30, 2022.

(51) Int. Cl.
*F16L 37/091* (2006.01)

(52) U.S. Cl.
CPC ....... *F16L 37/0915* (2016.05); *F16L 2201/10* (2013.01)

(58) Field of Classification Search
CPC . F16L 2201/10; F16L 37/091; F16L 37/0915; F16L 37/098; F16L 37/0982
See application file for complete search history.

(56) References Cited

U.S. PATENT DOCUMENTS

| | | |
|---|---|---|
| 3,819,207 A | 6/1974 | Leopold, Jr. |
| 4,248,460 A | 2/1981 | Murray et al. |
| 4,642,155 A | 2/1987 | Ramsey |
| 5,584,513 A | 12/1996 | Sweeny et al. |
| 6,258,197 B1 | 7/2001 | Helander |
| 7,025,842 B2 | 4/2006 | Monsheimer et al. |

(Continued)

FOREIGN PATENT DOCUMENTS

| | | |
|---|---|---|
| EP | 1995506 A2 | 11/2008 |
| GB | 2143918 A | 2/1985 |

(Continued)

OTHER PUBLICATIONS

International Search Report and Written Opinion; International Patent Application No. PCT/US2023/034177; Feb. 6, 2024.

*Primary Examiner* — Aaron M Dunwoody
(74) *Attorney, Agent, or Firm* — Barnes & Thornburg LLP

(57) ABSTRACT

The present application relates to connectors with an indicator feature for providing visibility within a connector body. The connectors include a connector body made of either a transparent or opaque material to provide visibility inside the connector body. The connector body defines a zone of indication that provides visual indication of two positions of the conduit. A first position of the conduit includes a position wherein the conduit is inserted beyond a seal portion of the connector but not fully inserted to a predetermined depth. And, a second position of the conduit includes a position wherein the conduit is sealed and fully inserted within the connector body to the predetermined depth (e.g., the predetermined depth includes a depth where an end of the conduit engages a conduit stop of the connector body).

30 Claims, 16 Drawing Sheets

(56) References Cited

U.S. PATENT DOCUMENTS

| | | |
|---|---|---|
| 7,867,420 B2 | 1/2011 | Wolter |
| 8,025,318 B1 | 9/2011 | Morroney et al. |
| 8,844,981 B1 | 9/2014 | Crompton et al. |
| 9,068,680 B1 | 6/2015 | Crompton et al. |
| 9,217,529 B2 | 12/2015 | Crompton et al. |
| 9,322,496 B1 | 4/2016 | Crompton et al. |
| 9,574,691 B1 | 2/2017 | Crompton et al. |
| 9,671,049 B1 | 6/2017 | Crompton et al. |
| 9,816,655 B2 | 11/2017 | Crompton et al. |
| 9,822,912 B2 | 11/2017 | Crompton et al. |
| 9,879,810 B2 | 1/2018 | Crompton et al. |
| 9,920,866 B2 | 3/2018 | Crompton et al. |
| 10,016,856 B2 | 7/2018 | Neal et al. |
| 10,094,500 B2 | 10/2018 | Crompton et al. |
| 10,180,202 B2 | 1/2019 | Crompton et al. |
| 10,550,966 B2 | 2/2020 | Blomberg |
| 10,850,451 B2 | 12/2020 | Lennon et al. |
| 11,105,452 B1 | 8/2021 | Dias et al. |
| 2004/0070198 A1 | 4/2004 | Rohrig |
| 2006/0108705 A1 | 5/2006 | Rowley |
| 2011/0025054 A1 | 2/2011 | Kluss |
| 2013/0181446 A1* | 7/2013 | Le Clinche .............. F16L 43/00 285/345 |
| 2014/0152002 A1 | 6/2014 | Crompton et al. |
| 2017/0082231 A1 | 3/2017 | Crompton et al. |
| 2018/0001571 A1 | 1/2018 | Lennon et al. |
| 2019/0257454 A1 | 8/2019 | Crompton et al. |
| 2020/0276771 A1 | 9/2020 | Shi et al. |
| 2021/0324986 A1 | 10/2021 | Simon |

FOREIGN PATENT DOCUMENTS

| | | |
|---|---|---|
| GB | 2313888 B | 12/1997 |
| JP | 2003314763 A | 11/2003 |
| JP | 2004324858 A | 11/2004 |
| JP | 2008286258 A | 11/2008 |
| JP | 2010043729 A | 2/2010 |
| JP | 2012077803 A | 4/2012 |
| JP | 2012180940 A | 9/2012 |
| JP | 2012219894 A | 11/2012 |
| JP | 2016075308 A | 5/2016 |
| MY | 143104 A | 3/2011 |
| WO | 2020036637 A1 | 2/2020 |

* cited by examiner

PLUMBING CONNECTOR

PRIORITY CLAIM

This application is a bypass continuation of International Patent Application No. PCT/US2023/034177, filed Sep. 29, 2023, which claims priority to U.S. Provisional Patent Application No. 63/377,921, filed Sep. 30, 2022.

INCORPORATION BY REFERENCE

The disclosure and figures of International Patent Application No. PCT/US2023/034177, filed Sep. 29, 2023, and U.S. Provisional Patent Application No. 63/377,921, filed Sep. 30, 2022, are incorporated by reference herein as if set for in their entireties.

TECHNICAL FIELD

The present disclosure relates generally to pipe fittings. More specifically, the present disclosure relates to push-to-connect fittings.

BACKGROUND

Conduits are used to carry a variety of liquids and/or gases. Couplings, connectors, and fittings are used to join the conduits in various ways so that the conduits can be arranged in different configurations to move fluids through the conduits. The conduits may be stiff or rigid as with metal or plastic pipes used in household plumbing applications, or the conduits may be flexible. Connectors are used for end-to-end connection of conduits, or they can route conduits at different directions relative to the conduit axis. For example, connectors can be employed to change the direction of piping, such as by a 45° or 90° angle with respect to a flow passage through the pipe to which the connector is connected. Connectors can also be employed to branch or split piping in different directions. For example, a single pipe section can be connected by a T-fitting or a Y-fitting or a multi-conduit joint or a change in diameter.

In some instances, it may be beneficial for a user to identify when a conduit is fully inserted within a connector fitting. For an outer diameter seal configuration, there may be challenges to designing a push-to-connect fitting with an indicator feature without adding complexity or cost due to materials, components, etc. Hence, there is a need in the art for providing an indicator feature for a push-to-connect fitting that is simple, low cost and compatible with a variety of conduits. The present disclosure addresses this and other related and unrelated issues.

SUMMARY

The present application relates to connectors with an indicator feature for providing visibility within a connector body. For example, a connector can include a connector body made of either a transparent or opaque material to provide visibility through the connector body. The connector body defines a zone of indication that provides visual indication of two positions of the conduit. A first position of the conduit includes a position where the conduit is inserted beyond a seal portion of the connector but not fully inserted to a predetermined depth. And, a second position of the conduit includes a position wherein the conduit is sealed and fully inserted within the connector body to the predetermined depth (e.g., the predetermined depth includes a depth where an end of the conduit engages a conduit stop of the connector body).

In certain examples, connectors may be coupled to a conduit such that they are not easily removed. In other examples, a conduit may be detachable from the connectors to allow the connectors to be reused (e.g., using a demounting tool or other suitable tool or mechanism). As such, the connectors may be detachable without risk of damage to the conduit or connector.

Aspects of the present disclosure relates to a connector assembly that includes a connector body with a first end that defines a first opening and an opposite second end that defines a second opening. The connector body defines a fluid passage that extends through the first and second ends, placing the first and second ends in fluid communication. The connector body includes at least a portion having a plastic construction that is light transmissive, where the portion of the connector body including the plastic construction that is light transmissive is provided as a push-to-connect fitting and at least partially defines a visible indication zone.

The connector assembly may include a first sealing member configured to be inserted into the first opening of the connector body to form a sealing engagement with a first fluid conduit, and a second sealing member configured to be inserted into the second opening of the connector body to form a sealing engagement with a second fluid conduit.

The connector assembly may include a first grab ring that has a plurality of teeth configured for coupling to the first fluid conduit, and a second grab ring that has a plurality of teeth configured for coupling to the second fluid conduit.

The connector assembly may include a first protection ring partially positioned within the connector body at the first end thereof between the first grab ring and the first sealing ring, a second protection ring partially positioned within the connector body at the second end thereof between the second grab ring and the second sealing ring.

The connector assembly may include a first end cap configured to mount on the connector body at the first end thereof and a second end cap configured to mount on the connector body at the second end thereof. The visible indication zone provides visual indication of two positions of the first and second fluid conduits inside the connector body. A first position of the first and second fluid conduits includes a position where the first and second fluid conduits are respectively inserted beyond a seal portion of the connector body but not fully inserted to a predetermined depth defined by a conduit stop within the connector body. A second position of the first and second conduits includes a position where the first and second conduits are sealed and fully inserted within the connector body to the predetermined depth.

In certain examples, the first and second end caps have a reduced transparency in relation to the connector body, such that the end caps at least partially restrict the visibility of the conduit so as to define a portion or an end (e.g., a starting point or initial end) of the zone of indication. In this regard, the end caps may define the first end (or starting point/portion) of the zone of indication, such that, when a portion of the conduit is visible/appears passed the end cap, a visual indication is provided that the conduit is in the first position (i.e., engaged by the seal portion but not inserted to the predetermined depth).

The first end cap may have an interior wall with a step configuration and a first support wall to support the first grab ring when the first end cap is attached to the connector body.

The second end cap may have an interior wall with a step configuration and a second support wall to support the second grab ring when the second end cap is attached to the connector body.

Further aspects of the present disclosure relate to a push-to-connect fitting that includes a connector body with a first end that defines a first opening and an opposite second end that defines a second opening. The connector body defines a fluid passage that extends through the first and second ends, placing the first and second ends in fluid communication. The connector body is configured to receive a conduit and has an end stop. The connector body has a light transmissive portion with a plastic construction.

The push-to-connect fitting may include a sealing member configured to provide an outer diameter seal with a fluid conduit; a grab ring that includes a plurality of teeth configured for coupling to the fluid conduit; a protection ring partially positioned within the connector body between the grab ring and the sealing ring; and an end cap configured to mount on the connector body. The end cap may have an interior wall with a step configuration and a support wall configured to support the grab ring when the end cap is attached to the connector body. In certain examples, the end cap has a reduced transparency in relation to the connector body, such that the end cap at least partially restricts the visibility of the fluid conduit so as to define a portion or an end (e.g., starting point or initial end) of the zone of indication.

The push-to-connect fitting may include an indication zone at least partially defined by the light transmissive portion of the connector body. The light transmissive portion providing indication of two positions of the fluid conduit including a first position where the fluid conduit is partially inserted and sealed by the sealing member and a second position where the fluid conduit is fully inserted to engage the end stop.

Another aspect of the present disclosure relates to a method of assembling a connection fitting. The method includes a step of obtaining a connector body that defines a channel that extends therethrough. The connector body is configured to receive a conduit and has an end stop. The method includes a step of positioning an o-ring sealing member in the channel of the connector body; a step of positioning a protection ring adjacent an end of the connector body; and a step of positioning a grab ring adjacent the projecting ring such that the protection ring is partially positioned within the connector body between the grab ring and the sealing ring. The method further includes a step of positioning an end cap on the connector body. The grab ring may be retained with the assistance of the end cap. The grab ring is configured to grip an outer surface of the conduit.

The connector body has a light transmissive portion with a plastic construction. The connector body includes an indication zone at least partially defined by the light transmissive portion of the connector body. The indication zone provides indication of two positions of the conduit that includes a first position where the conduit is partially inserted and sealed by the o-ring sealing member and a second position where the conduit is fully inserted to engage the end stop.

In certain examples, the conduit is removably configured to be inserted into the channel of the connector body. The two positions of the conduit are viewable by a naked eye.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

The present application is directed to push-to-connect fittings for use with conduits (e.g., PEX tubings, copper pipes, PVC tubes, CPVC pipes, and the like). These fittings are configured to provide a seal with an end portion of the conduits. That is, a substantially watertight connection can be formed. These push-to-connect fittings may be used with fluid conduits of varying diameters, including fluid conduits having a diameter less than 0.25 inches to fluid conduits having a diameter of greater than 2 inches or more.

Figure 1:
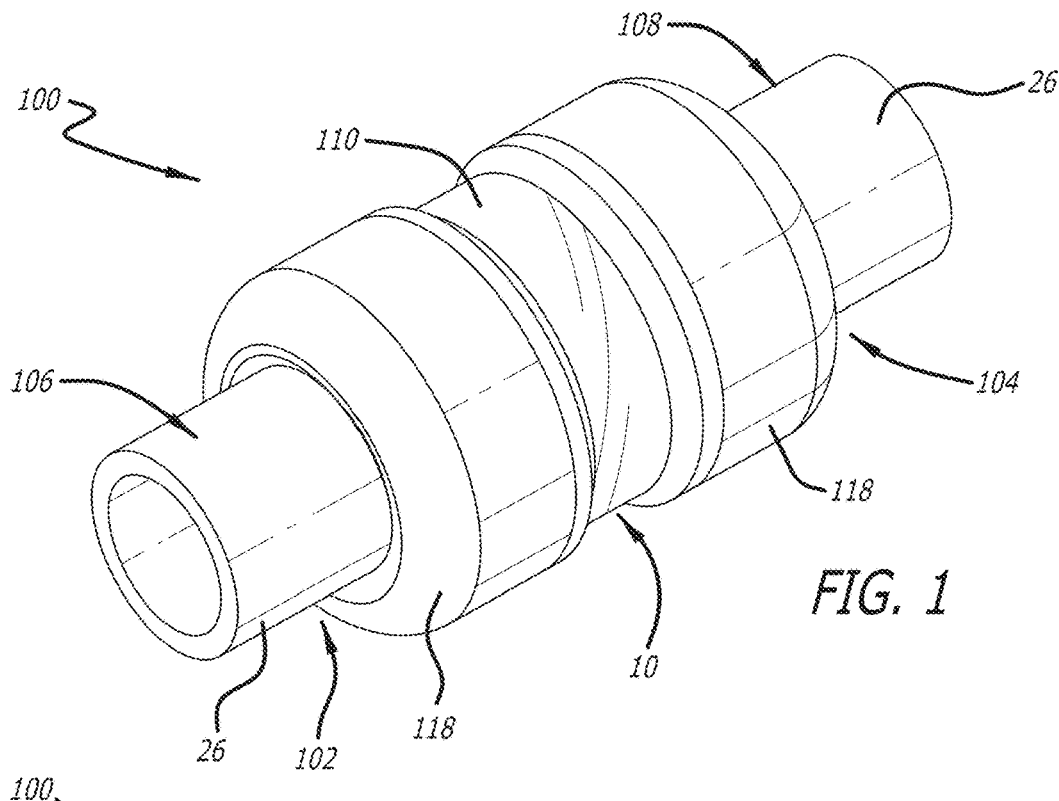
FIG. 1 illustrates a perspective view of an example connector assembly in accordance with principles of the present disclosure.
Figure 2:
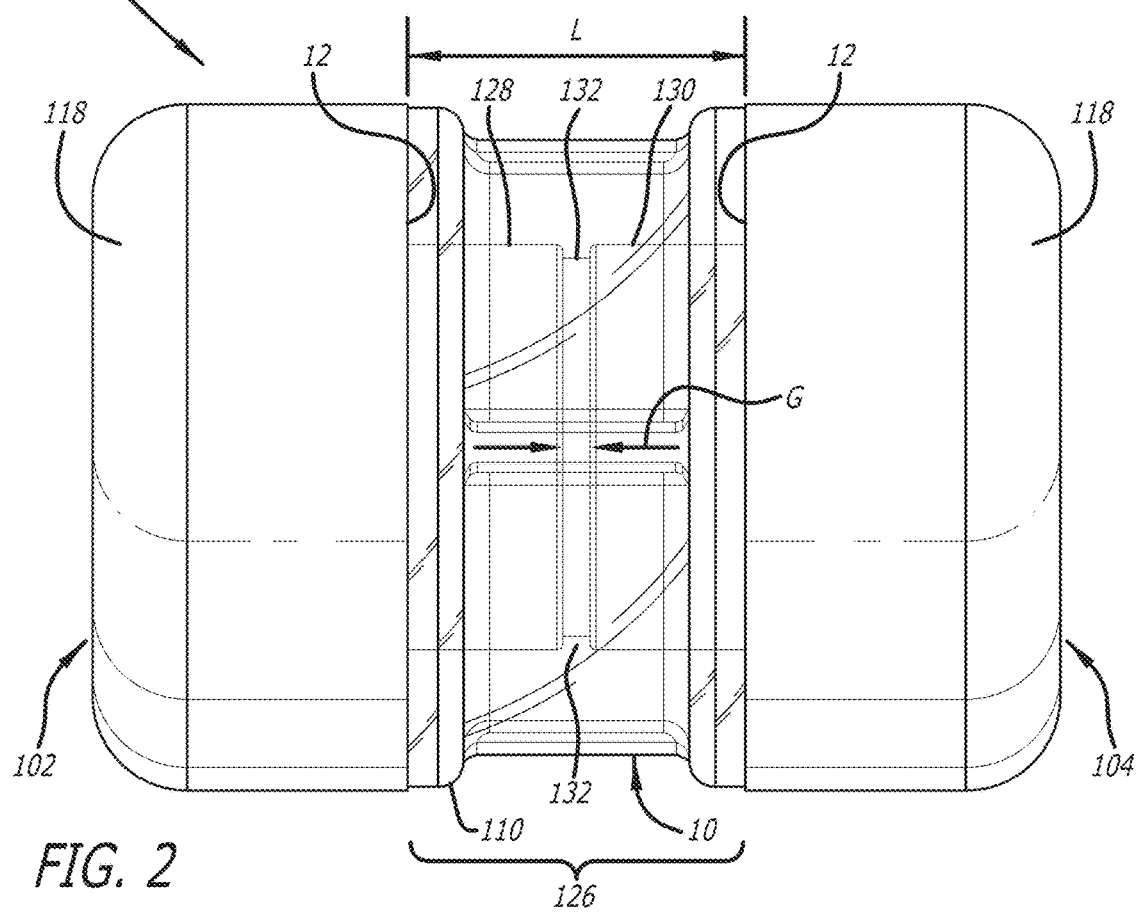
FIG. 2 illustrates a side view of the connector assembly of FIG. 1.

FIG. 1 illustrates an example connector assembly 100 (e.g. push-to-connect fitting) in accordance with the principles of the present disclosure. The connector assembly 100 has a first end 102 and an opposite second end 104 configured to receive and connect to a portion of a tube or tubular member (e.g., a pipe, conduit, etc.), in particular an end of the tube. As shown, a first conduit 106 is positioned at the first end 102 and a second conduit 108 is positioned at the second end 104. FIG. 2 shows the connector assembly 100 with the first and second conduits 106, 108 removed.

Figure 3:
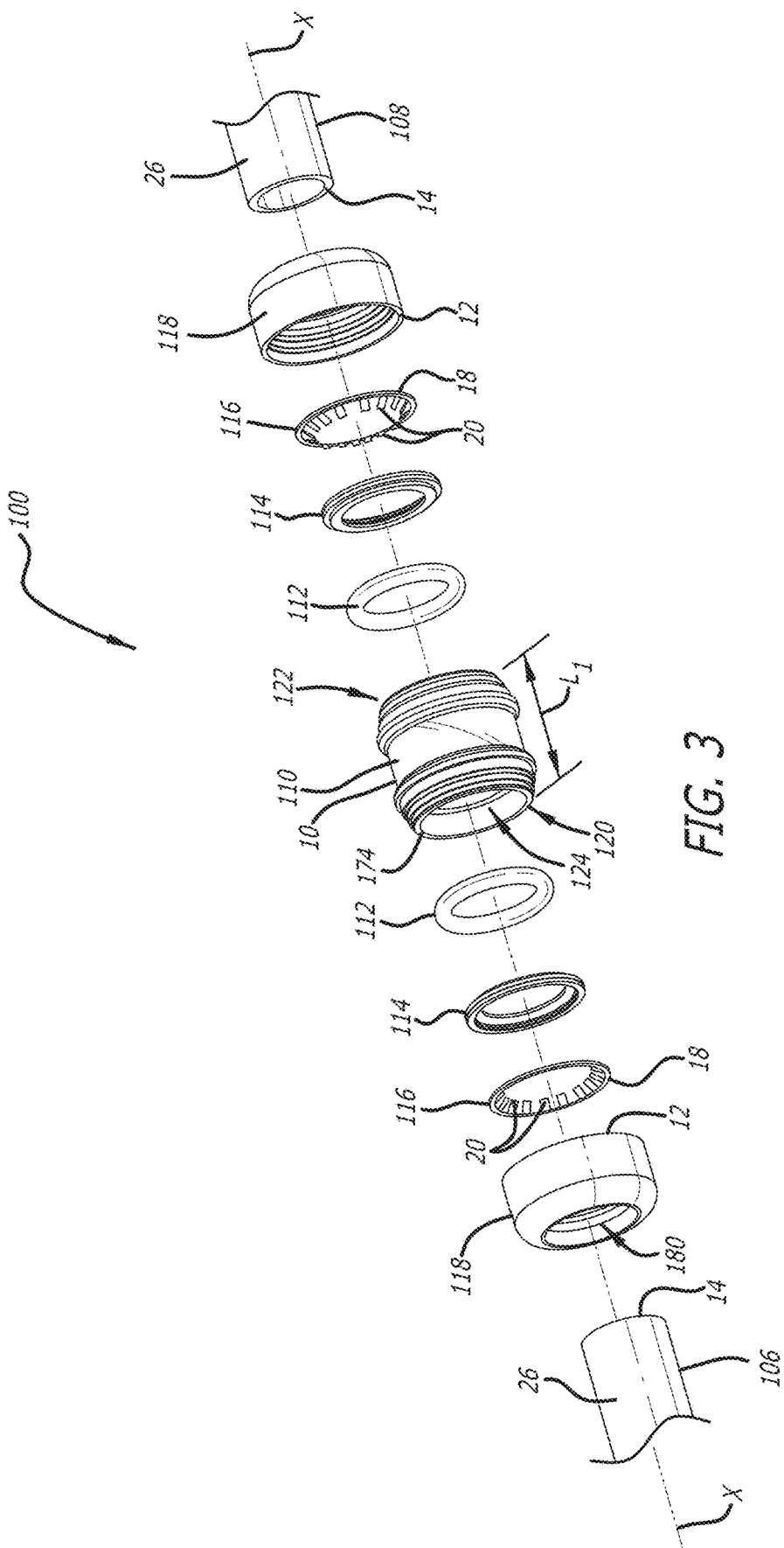
FIG. 3 illustrates an exploded perspective view of the connector assembly of FIG. 1 including a connector body, conduits, sealing members, grab rings, protection rings and end caps.

FIG. 3 illustrates an exploded view of the connector assembly 100. The connector assembly 100 may include a connector body 110, sealing members 112 (e.g., annular o-ring sealing member), protection rings 114, grab rings 116, and end caps 118. The connector body 110 may be a cylindrical main body with a first end 120 and an opposite, second end 122 that together define a fluid passage or body interior 124 that extends through the first and second ends 120, 122 along a longitudinal length thereof, placing the first and second ends 120, 122 in fluid communication. The first and second ends 120, 122 may be entrance ends to the connector body 110 for receipt of end portions of respective conduits. As illustrated, each of the first and second ends 120, 122 of the connector body 110 includes the sealing member 112, the protection ring 114, the grab ring 116 and the end cap 118. The end cap 118 is configured to facilitate retention of the sealing member 112, the protection ring 114 and the grab ring 116 at the first and second ends 120, 122 of the connector body 110. When the end caps 118 are respectively mounted at the first and second ends 120, 122 of the connector body 110, portions of the transparent connector body 110 may be covered.

The connector assembly 100 may be made in a variety of configurations and sizes that are designed to handle various fluid applications. For example, the connector assembly 100 may include a straight-line connector body or coupler, an elbow connector body or coupler, a t-shaped connector body or coupler, a blind-end connector body that blocks flow, a connector body configured to receive different diameter fluid conduits, an angle connector body, a multi-line (or 4-way) connector body, a wye (Y) connector body, a tee-wye connector body, another type of connector body or combinations of connector bodies.

The connector body 110 may be constructed as a single-piece and comprises a single unitary, integral component that cannot be separated without damage to the first and second conduits 106, 108 or connector body 110. The connector body 110 may be made of a plastic or other polymeric material suitable for the intended application, such as polyphenylsulfone (PPSU), although alternatives are possible. At least a portion of the connector body 110 may include a plastic construction that is light transmissive, e.g., to allow visibility through the portion of the connector body. The use of plastic material may assist in reducing the complexity, part count and cost of connectors. In other examples, the connector body 110 may include a viewing window for allowing visual inspection of the first and second conduits 106, 108 during insertion. That is, only a portion of the connector body 110 that includes the viewing window may be made with a transparent material to provide visibility to an indication zone 126 (see FIG. 2).

In some examples, the connector assembly 100 may include a tube liner 101 that may be retained within conduits of the connector assembly 100. For example, the first and second conduits 106, 108 may each include a tube liner 101 to prevent light transmission therethrough. The advantageous feature of having the tube liner 101 allows the transparent connector body 110 to be utilized in applications where light transmission is not preferred or not permitted by relevant regulations or standards but visible indication of full insertion of the conduits is desired.

In still other examples, a separate element (e.g., a snap-ring, a c-ring, a cover, a sleeve or similar part) (not shown) may be used to cover any transparent portion or section of the connector body 110 to prevent light transmission. That is, a separate element may be placed on the outside of the transparent connector body 110 to limit light infiltration. In certain examples, the separate element may be placed within a recessed portion 10 of the connector body 110.

In the example depicted, the entire connector body 110 is made with a plastic construction, although alternatives are possible. As such, the entire connector body 110 may be clear or transparent to provide or at least partially define an indication zone 126 for viewing the body interior 124. In other examples, at least a portion of the connector body 110 may be transparent to allow visibility of the indication zone 126. Even with the end caps 118 mounted at the first and second ends 120, 122 of the connector body 110, there still remains a visible area on the connector body 110 that includes the indication zone 126.

Figure 4:
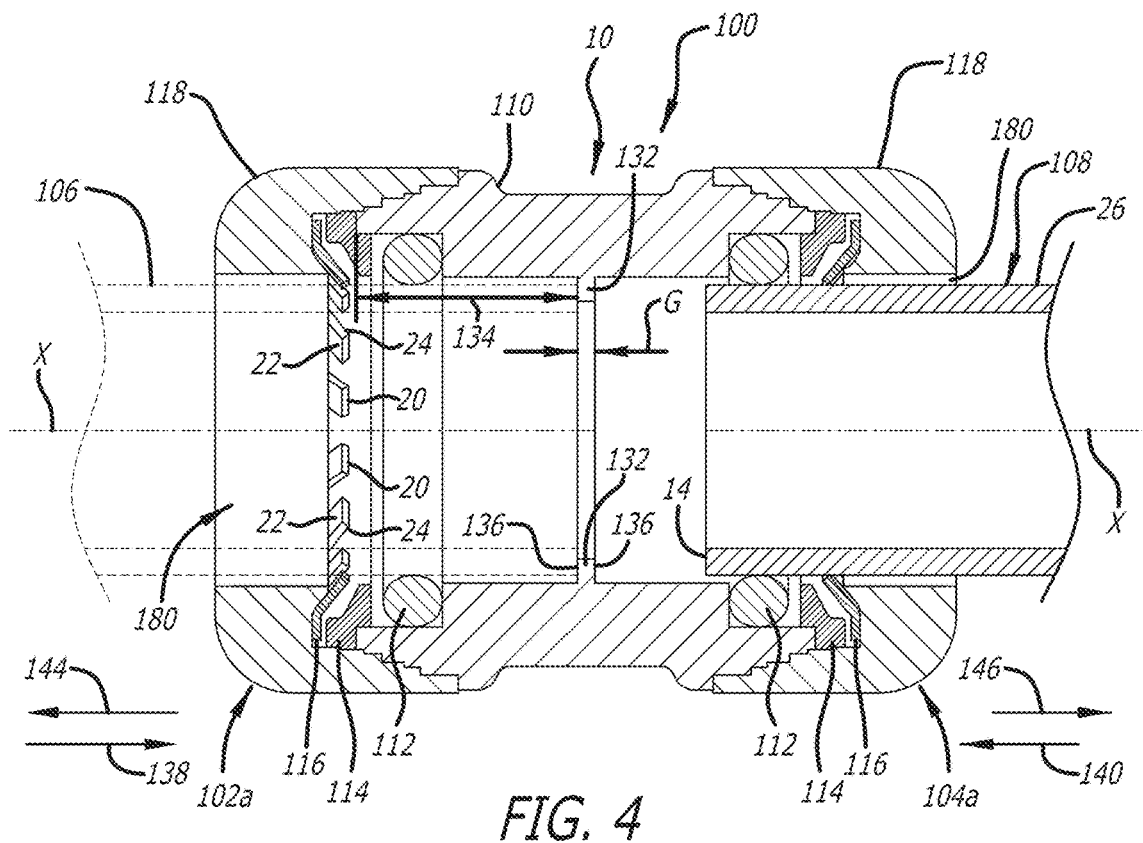
FIG. 4 illustrates a cross-sectional view of the connector assembly of FIG. 1 with one conduit partially inserted into the connector body.

Turning to FIG. 4, a cross-sectional view of the connector assembly 110 is depicted. The first conduit 106 is shown inserted fully into the connector body 110 and the second conduit 108 is shown partially inserted into the connector body 110. The connector assembly 110 provides visible indication of two positions of the conduit within the indication zone 126. A first position of the first conduit 106 includes a position wherein the first conduit 106 is inserted beyond a seal portion of the connector body 110 but not fully inserted to a predetermined depth 134. That is, a conduit may be partially inserted into the connector body 110 from the first and/or second ends 120, 122 where the insertion of the conduit(s) is past or beyond the sealing member 112 as shown in FIG. 4. A second position of the first conduit 106 includes a position wherein the first conduit 106 is sealed and fully inserted within the connector body 110 to the predetermined depth 134 (e.g., the predetermined includes a depth where the end of the conduit engages a conduit stop of the connector body).

In the example depicted, the end caps 118 are not transparent, although alternative are possible. As such, when the end caps 118 are mounted to the connector body 110, portions of the transparent connector body 110 are covered such that only the indication zone 126 of the connector body 110 is shown.

The indication zone 126 provides visibility within the body interior 124 of the connector body 110 for visual inspection by a naked eye of ends of the first and second conduits 106, 108. The indication zone 126 may have a length L (see FIG. 2) defined along a length L1 of the connector body 110. In certain examples, the length L of the indication zone 126 may be defined between distal ends 12 of the end caps 118. It will be appreciated that dimensions of the end caps 118 may change the length L of the indication zone 126. That is, as the coverage on the connector body 110 by the end caps 118 varies, the length L of the indication zone 126 of the connector body 110 may vary. Further details regarding the end caps 118 will be described with reference to FIG. 9.

Turning again to FIG. 2, the connector body 110 defines first and second cavities 128, 130 (e.g., internal bores, receptacles, etc.) for receiving the first and second conduits 106, 108, respectively. The first and second cavities 128, 130 are nonthreaded cavities, although alternatives are possible. The first and second cavities 128, 130 provide a snug sliding fit for the first and second conduits 106, 108 when inserted therein. The first and second cavities 128, 130 allow the first and second conduits 106, 108 to be fluidly connected to one another. It will be appreciated that fluid flow may occur in either direction between the first and second conduits 106, 108.

The connector body 110 incudes a circumferential rib 132 (e.g., divider, lip, step) centrally located inside the connector body 110 between ends of the respective first and second cavities 128 to prevent the first and second conduits 106, 108 from moving any further into the connector body 110.

The circumferential rib 132 also defines a predetermined depth 134 (see FIG. 4) for which the first and second conduits 106, 108 may each be inserted into the first and second cavities 128, 130 of the connector body 110. The predetermined depth 134 may refer to the depth that the first and second conduits 106, 108 may each be inserted into the connector body 110 in order to be fully or completely inserted. The predetermined depth 134 is the longitudinal distance between the respective first and second ends 120, 122 (i.e., entrance ends) of the connector body 110 and the circumferential rib 132. Axial end face stops 136 are defined on opposing sides of the circumferential rib 132 at the predetermined depth 134 for the first and second conduits 106, 108 to engage when inserted fully into the connector body 110. That is, ends 14 (see FIG. 3) of the first and second conduits 106, 108 may abut or press against the axial end face stops 136 of the circumferential rib 132 when the first and second conduits 106, 108 are fully inserted inside the connector body 110 to the predetermined depth 134. The circumferential rib 132 may provide a spacing or gap G between distal ends of the first and second cavities 128, 130 of the connector body 110.

Still referring to FIG. 4, the indication zone 126 of the connector body 110 provides visibility of the first and second conduits 106, 108 upon insertion. The indication zone 126 may expand longitudinally along the connector body 110 a distance between both distal ends 10 of the end caps 118. The indication zone 126 provides indication for a plurality of positions of the first and second conduits 106, 108, e.g., two positions of the first and second conduits 106, 108. Specifically, the indication zone 126 provides a visible indication of when the first and second conduits 106, 108 are partially inserted into the connector body 110 (e.g., at a first conduit position) through at least the seal of the connector assembly 100 provided by the sealing member 112. The indication zone additionally provides a visible indication of when the first and second conduits 106, 108 are fully inserted into the connector body 110 through the sealing member 112 of the connector assembly 100 to the respective axial end face stops 136 or predetermined depth 134 (e.g., at a second position). Partial insertion my include up to a location before reaching the axial end face stop 136 or predetermined depth 134 of the respective first and second cavities 128, 130.

The sealing member 112 may be formed of a resilient material, such as rubber, EPDM, or other suitable elastomers. The sealing members 112 are shown as an O-ring with a circular cross-section. The sealing members 112 are configured to fit into and seal against the connector body 110 and to form a substantially fluid tight seal with the conduits passing through an inner diameter of the sealing members 112. As such, the sealing members 112 provide an outer diameter seal with the conduits passing through and allow for easier insertion. For example, the sealing members 112 located at the respective first and second ends 120, 122 of the connector body 110 are respectively positioned on the outer body of the first and second conduits 106, 108 to provide for sufficient sealing of the first and second conduits 106, 108 within the connector body 110.

The first conduit 106 can be inserted into the connector body 110 by moving the first conduit 106 in a first direction 138 along a longitudinal axis X of the connector assembly 100 into the connector body 110. The second conduit 108 can be inserted into the connector body 110 by moving the second conduit 108 in a second direction 140 along the longitudinal axis X of the connector assembly 100 into the connector body 110. As shown in FIG. 4, the second conduit 108 is partially inserted into the connector body 110 but are completely sealed. That is, when the ends 14 of the first and second conduits 106, 108 are only partially inserted into the connector body 110 (i.e., a partial insertion position), the ends 14 of the respective first and second conduits 106, 108 may be positioned at a depth that is less than the predetermined depth 134 within the connector body 110. That is, the end 14 of the respective first and second conduits 106, 108 do not reach or engage the axial end face stops 136 of the circumferential rib 132 of the connector body 110. The indication zone 126 provides visibility of the respective first and second conduits 106, 108 once the ends 14 of the first and second conduits 106, 108 are partially inserted and passed through the sealing members 112 of the connector assembly 100.

Figure 5:
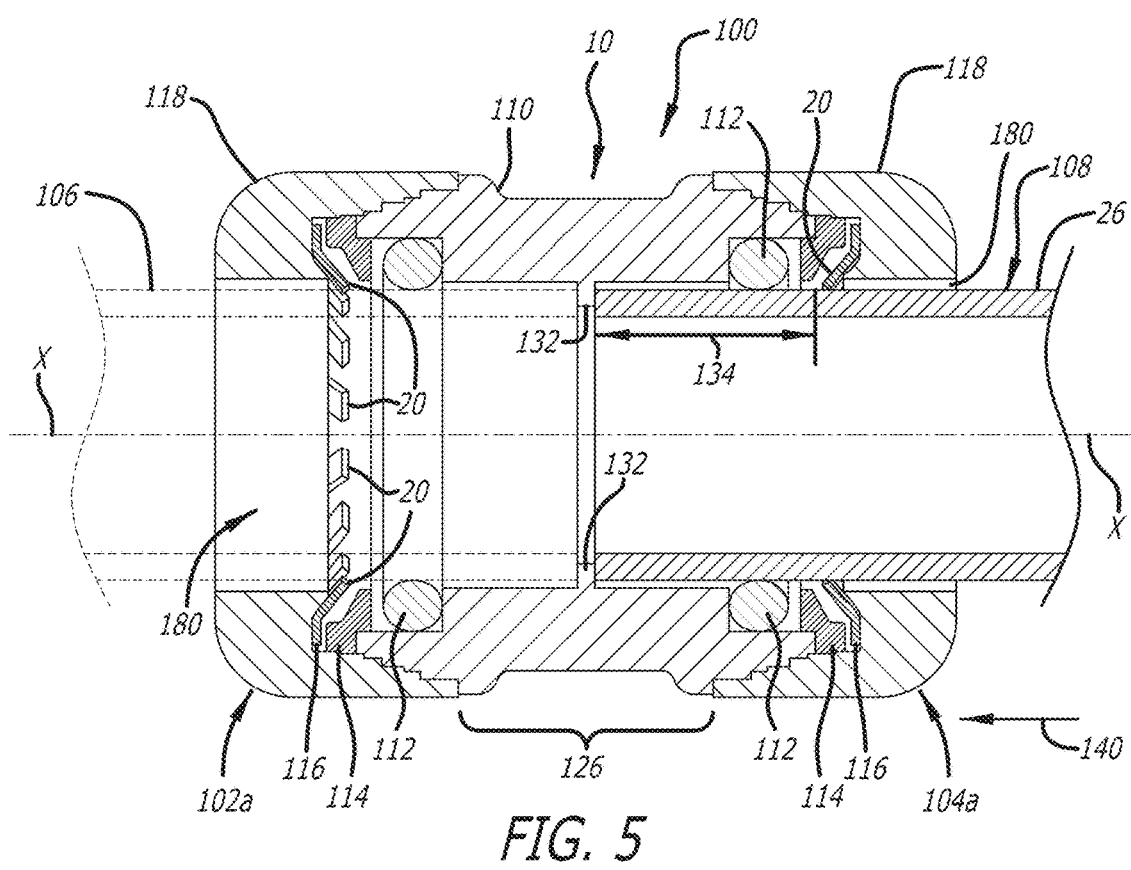
FIG. 5 illustrates a cross-sectional view of the connector assembly of FIG. 4 with the conduit fully inserted into the connector body.

Referring to FIG. 5, a cross-sectional view of the connector assembly 100 is depicted showing the indication zone 126 that provides visible indication that the respective first and second conduits 106, 108 are fully inserted into the connector body 110 along the longitudinal axis X. That is, the ends 14 of the first and second conduits 106, 108 are fully or entirely inserted into the connector body 110 (i.e., a complete insertion position) past the sealing member 112 such that the ends 14 of the respective first and second conduits 106, 108 are positioned at a depth that is equal to the predetermined depth 134 within the connector body 110. Once fully inserted, the end 14 of the respective first and second conduits 106, 108 are positioned at the predetermined depth 134 to interface with the axial end face stops 136. It will be appreciated that in the example depicted in FIG. 5, the first and second conduits 106, 108 are not removable from the connector body 110, although alternatives are possible.

Figure 6:
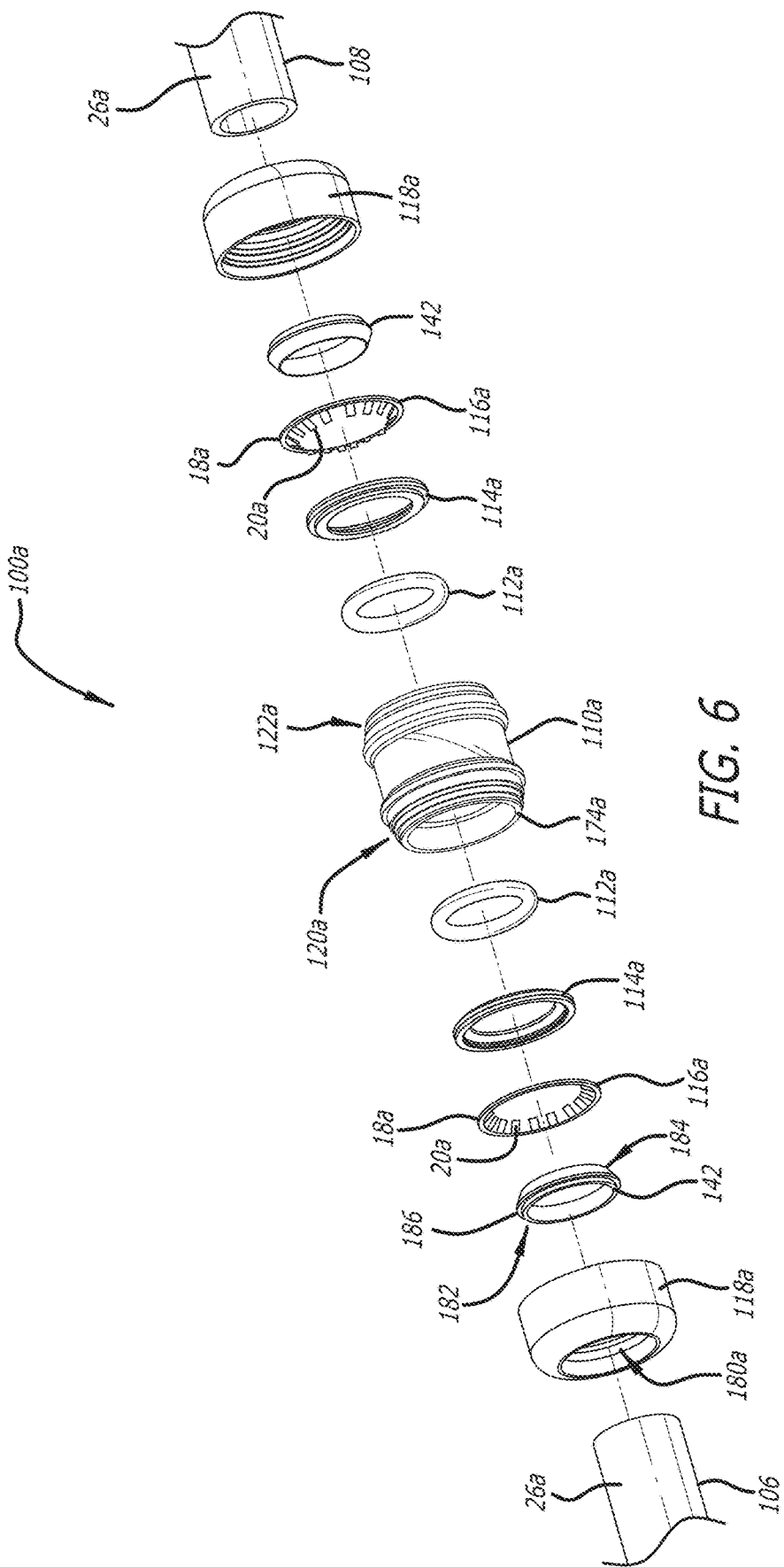
FIG. 6 illustrates an exploded perspective view of another connector assembly including a demount ring in accordance with the principles of the present disclosure.

FIG. 6 shows an exploded view of another example connector assembly 100a that is similar to the connector assembly 100 except that the connector assembly 100a includes a demount ring 142. The demount ring 142 is configured to allow first and second conduits 106a, 108a to be removed from a connector body 110a. The demount ring 142 can be positioned at first and second ends 102a, 104a of the connector assembly 100a.

Figure 7:
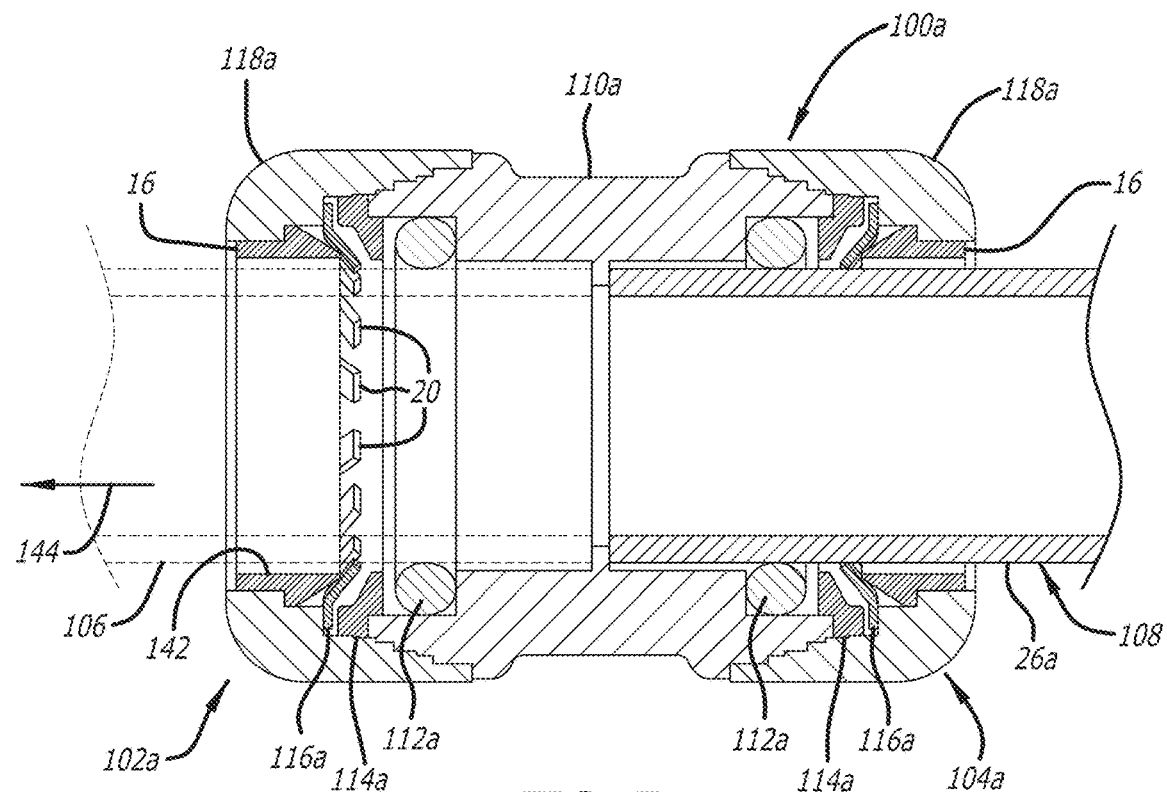
FIG. 7 illustrates a cross-sectional view of the connector assembly of FIG. 6 showing the demount ring in an initial retracted position.
Figure 8:
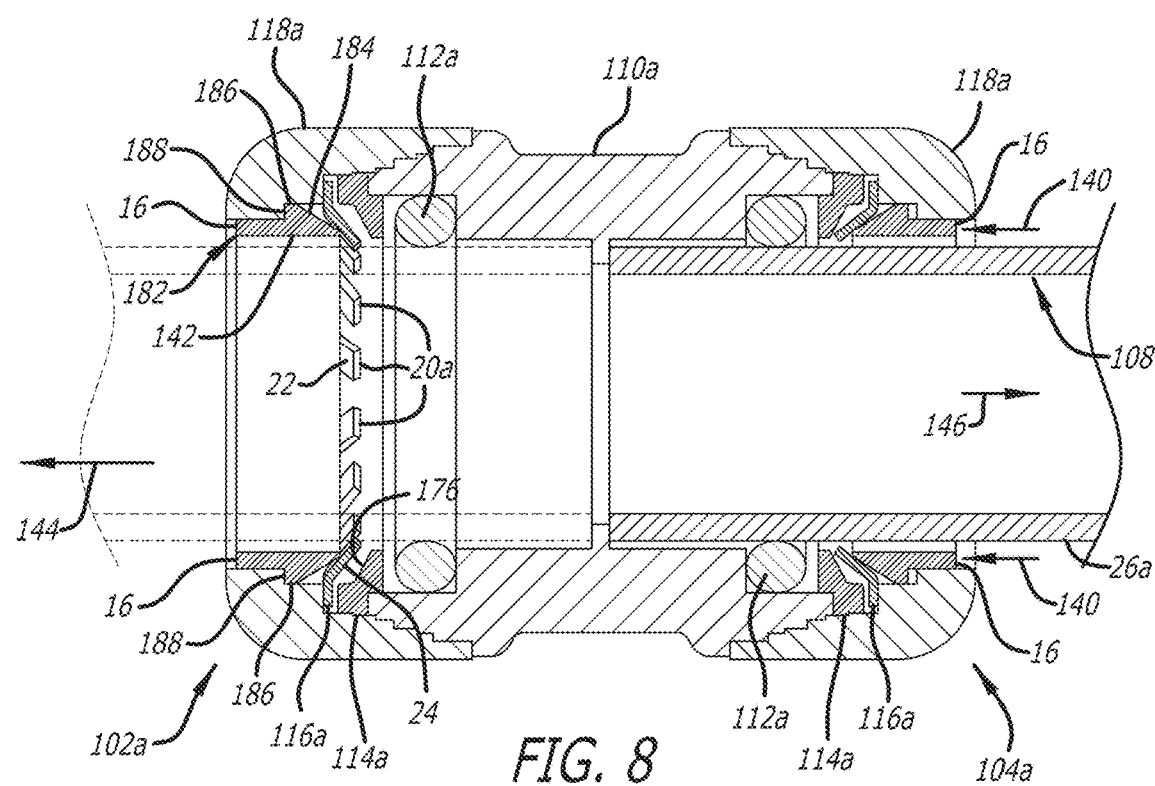
FIG. 8 illustrates a cross-sectional view of the connector assembly of FIG. 7 showing the demount ring in an extended position.

FIGS. 7-8 show the demount ring 142 assembled as part of the connector assembly 100a at both the first and second ends 102a, 104a. The demount ring 142 is positioned inside of end caps 118a such that an end 16 of the demount ring 142 is not visible outside of the connector assembly 100a. That is, the demount ring 142 has no features that extend outside or beyond the end caps 118a when the end caps 118a are attached to the connector body 110a. Advantageously, there is no risk of the demount ring 142 being accidentally removed. The demount ring 142 may be pushed in either the first and second directions 138, 140 to allow the respective first and second conduits 106a, 108a to be removed from the connector body 110a by moving backwards along the longitudinal axis X in third and fourth directions 144, 146 opposite to the first and second directions 138, 140, respectively.

Figure 9:
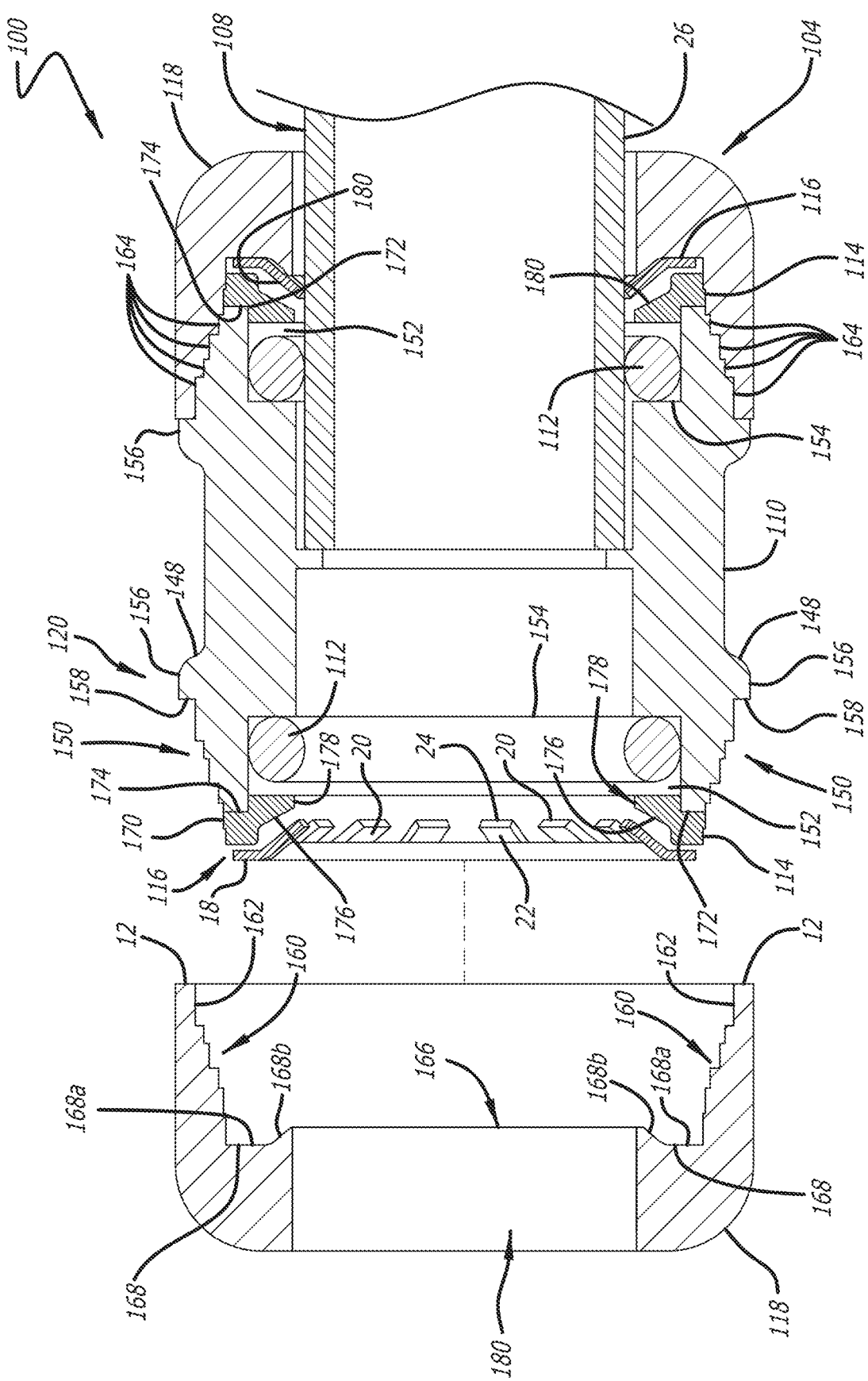
FIG. 9 illustrates a cross-sectional view of the connector assembly of FIG. 1 with one end cap exploded from the connector body.
Figure 10:
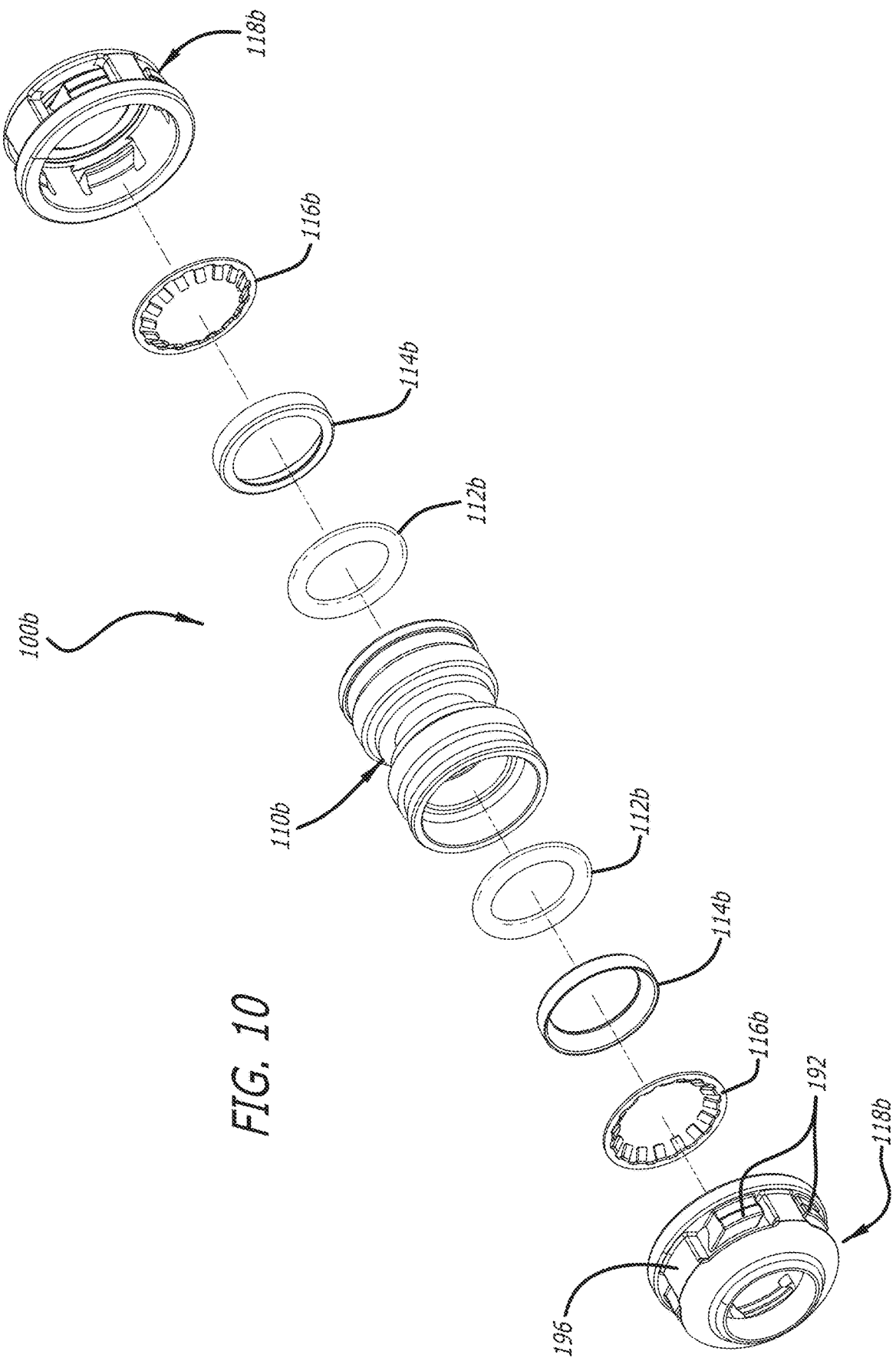
FIG. 10 illustrates an exploded perspective view of another connector assembly including snap-fit end caps in accordance with the principles of the present disclosure.
Figure 11:
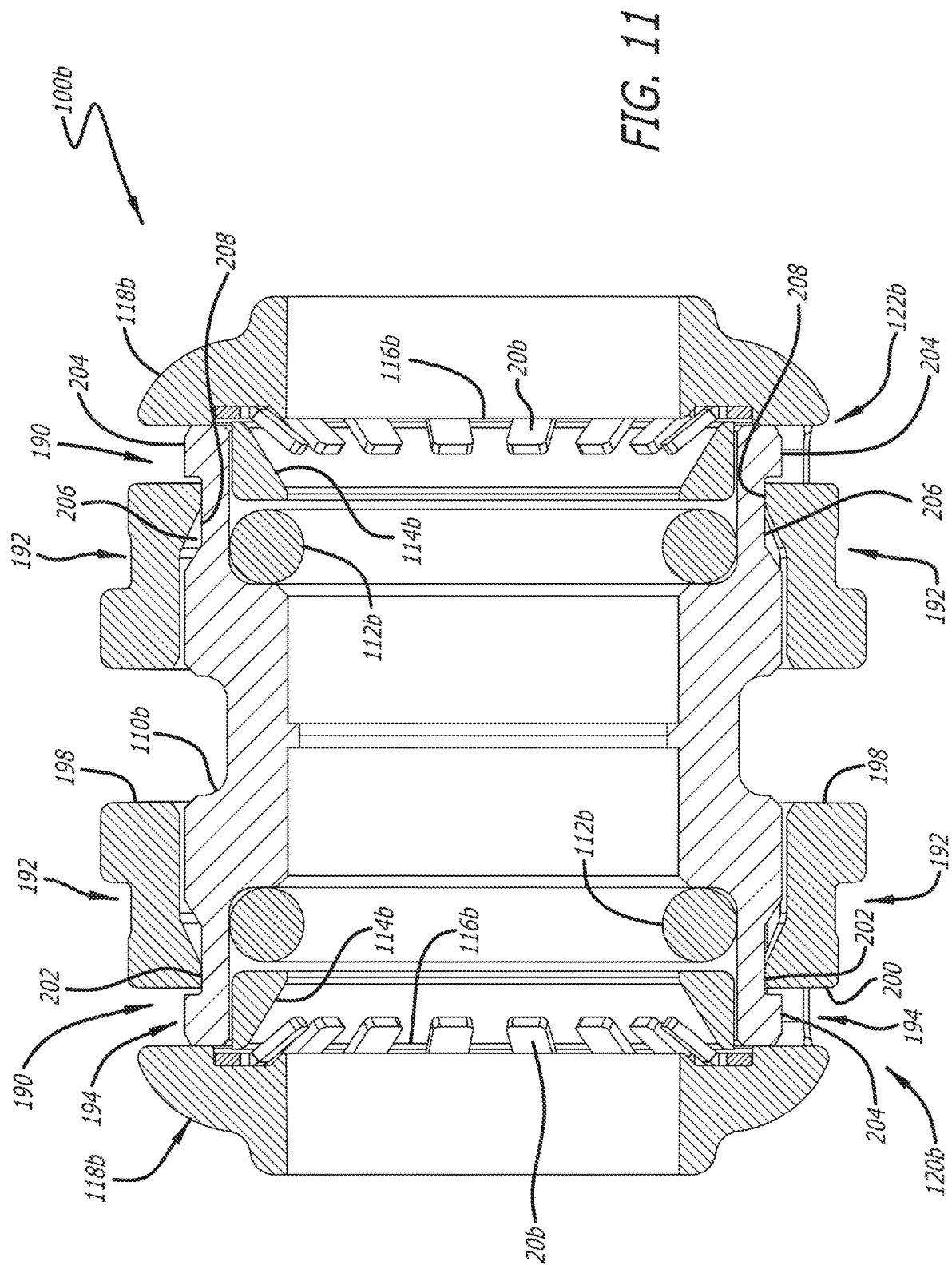
FIG. 11 illustrates a cross-sectional view of the connector assembly of FIG. 10 showing the snap-fit connection of the end caps to a connector body.
Figure 12:
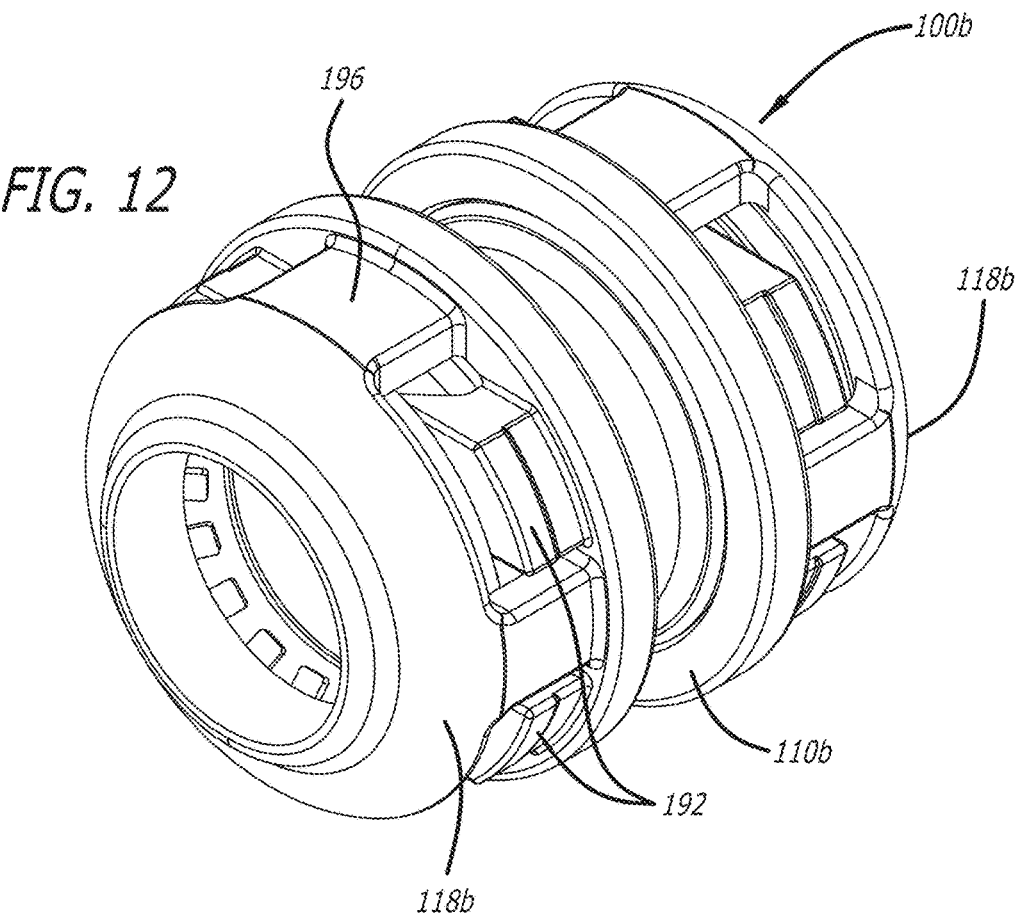
FIG. 12 illustrates a perspective view of the connector assembly of FIG. 11.
Figure 13:
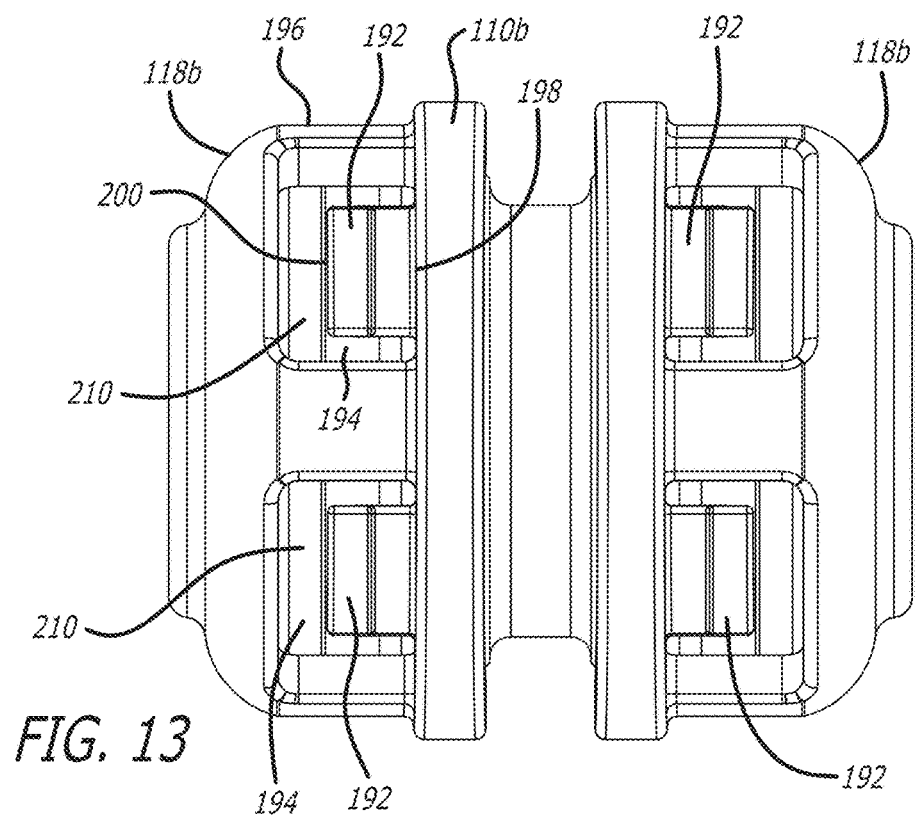
FIG. 13 illustrates a side view of the connector assembly of FIG. 12.

Referring to FIG. 9, the end cap 118 is shown exploded from the connector body 110. The end caps 118 may be made with a colored material or contain a special surface finish or texturing treatment that distinguishes it separately from the connector body 110. The end caps 118 can be securely attached to the connector body 110 using a variety of techniques. In one example, the end caps 118 may be ultrasonically welded to the connector body 118 at the first and second ends 120, 122, although alternatives are possible. In other examples, the end caps 118 may be attached to the connector body 110 using a snap-fit connection, as illustrated in FIGS. 10-13. In still other examples, the end caps 118 may be joined to the connector body 110 using adhesive or a threaded connection.

The connector body 110 has an outer surface 148 that includes a tapered step portion 150 at the first and second ends 120, 122. The step portion 150 provides an inner annular chamber 152 with an annular surface 154 within the connector body 110 that is configured to provide a seat for the sealing member 112. That is, the sealing member 112 can be housed within the inner annular chamber 152 and press against the annular surface 154 to provide sufficient sealing of the first and second conduits 106, 108 within the connector body 110.

The connector body 110 includes an outer flange portion 156 with an end face 158 on both the first and second ends 128, 130. The outer flange portion 156 extends outwardly with respect to the tapered step portion 150 and forms the outer perimeter of the connector body 110. The tapered step portions 150 of the connector body 110 taper inwardly from the outer flange portion 156 towards respective first and second ends 120, 122 of the connector body 110. That is, the tapered step portions 150 can be stepped downwardly relative to the end face 158 of the outer flange portion 156 of the connector body 110.

The tapered step portions 150 of the connector body 110 are configured to overlap with annular steps 160 formed on an inner wall 162 of the end caps 118. When the end caps 118 are externally mounted to the connector body 110, the distal ends 12 of the end caps 118 may interface with the end faces 158 of the outer flange portion 156 and the annular steps 160 of the end caps 118 may cooperate with the tapered step portions 150 of the connector body 110. In certain examples, the end caps 118 may be welded to the connector body 110 at the first and second ends 128, 130. As such, weld joints 164 may be created between the annular steps 160 of the caps 118 and the tapered step portions 150 of the connector body 110.

Still referring to FIG. 9, the end caps 118 have an inner cavity 166 with a support wall 168 integrally formed with the end caps 118 for supporting the grab ring 116. The support wall 168 of the end caps 118 has an annular surface 168a and a slant surface 168b extending from the annular surface 168a. The grab ring 116 has a ring 18 that engages the annular surface 168a of the support wall 168 of the end cap 118 when the end cap 118 is attached to the connector body 110, (i.e., when the connector assembly 100 is assembled). The grab ring 116 also includes a plurality of axially-inwardly facing teeth 20 that are slanted relative to the ring 18 and encircle the longitudinal axis X. The plurality of axially-inwardly facing teeth 20 include a proximal side 22 and a distal side 24. The plurality of axially-inwardly facing teeth 20 can be supported by the slant surface 168b of the support wall 168 when the connector assembly 100 is assembled. The grab rings 116 are configured to respectively secure the first and second conduits 106, 108 within the connector body 110 and prevent the conduits 106, 108 from backing out of the connector body 110 and moving in the third and fourth directions 144, 146, respectively. That is, the plurality of axially-inwardly facing teeth 20 of the grab rings 116 are configured to grip an outer surface 26 of the first and second conduits 106, 108, respectively. The grab ring 116 may be formed of metal, such as stainless steel.

When attached, the end cap 118 has a length that extends over the connector body 110 to cover the sealing member 112, the protection ring 114 and the grab ring 116. The protection rings 114 include an outer flange 170 that engages the annular steps 160 of the end caps 118. Advantageously, when the outer flange 170 on the protection rings 114 engages annular steps 160 of the end caps 118, the protection rings 114 and the end caps 118 are held together to secure the grab rings 114 between the support wall 168 of the end cap 118 and the protection ring 114.

The protection ring 114 also defines a notch or step 172 that receives a circumferential edge or lip 174 of the first and second ends 120, 122 of the connector body 110 when assembled. The protection ring 114 includes an inclined surface 176 inclined inward and toward a distal end 178 of the protection ring 114 so as to generally align with the plurality of axially-inwardly facing teeth 20 of the grab ring 116. The inclined surface 176 tapers to a smaller diameter as the inclined surface 176 extends away from the grab ring 116. The protection ring 114 may help prevent the plurality of axially-inwardly facing teeth 20 from contacting and damaging the sealing member 112. The protection ring 114 can be made of a suitable plastic, e.g., including but not limited to thermoplastics such as nylon fiber. The plurality of axially-inwardly facing teeth 20 are configured to flex radially outward and toward the inclined surface 176 of the protection ring 114 when the first and second conduits 106, 108 pass through the opening formed by the ring 18 and the plurality of axially-inwardly facing teeth 20 of the grab rings 116.

The end caps 118 each define an opening 180 for receiving the first and second conduits 106, 108, respectively. As such, ends of the first and second conduits 106, 108 may be inserted through the opening 180 of the end caps 118 into the indication zone 126 of the connector body 110 that provides indication of partial insertion upon sealing and full insertion. The opening 180 also receives the demount ring 142.

Turning again to FIG. 8, the demount ring 142 is shown inserted through the opening 180 of the end caps 118. The demount ring 142 includes a tubular proximal end (e.g., free end) 182, an inclined distal end 184 and a stop flange 186 positioned between the inclined distal end 184 and the tubular proximal end 182. The inclined distal end 184 is configured to generally conform to the conical shape formed by the plurality of axially-inwardly facing teeth 20 of the grab ring 116. The stop flange 186 of the demount ring 142 contacts an internal should 188 of the end cap 118 when inserted to provide a snap connection to prevent the demount ring 142 from moving out of the end cap 118. The inclined distal end 184 of the demount ring 142 is on the proximal side 22 of the plurality of axially-inwardly facing teeth 20, while the inclined surface 176 of the protection ring 114 is on the distal side 24 of the plurality of axially-inwardly facing teeth 20. As such, the plurality of axially-inwardly facing teeth 20 are positioned between the inclined distal end 184 of the demount ring 142 and the inclined surface 176 of the protection ring 114.

To allow the first and second conduits 106a, 108a to be removed from the connector body 110a, the grab rings 116a can be opened by pushing the demount ring 142 axially to an extended position toward the plurality of axially-inwardly facing teeth 20 in the first and second directions 138, 140, (with, for example, a tool) which moves the plurality of axially-inwardly facing teeth 20 radially outwardly from the first and second conduits 106a, 108a, thereby opening the grab rings 116a and releasing the grab rings 116a from the outer surface 26a of the first and second conduits 106a, 108a, respectively. The first and second conduits 106a, 108a can then be removed and backed out from the connector body 110a in the third and fourth directions 144, 146. Once the first and second conduits 106a, 108a are removed from the connector body 110a, the demount ring 142 can be retracted back to a retracted position from the extended position.

Turning to FIGS. 10-13, another example connector assembly 100b is depicted. The connector assembly 100b is similar to the connector assemblies 100, 100a except for the end caps 118b. In the example illustrated, the end caps 118b are attached to the connector body 110b via a snap-fit connection 190. It will be appreciated that the ultrasonic welded connection example described above provides the connector assembly 100 with a smaller form factor compared to the snap-fit connection 190.

The end caps 118b each include resilient latches 192 in the form of a rectangular tab that are defined by latch cutouts 194. The latch cutouts 194 extend through a sidewall 196 of the end caps 118b and are generally U-shaped, although alternatives are possible. In the example depicted, there are four equally spaced latches 192 circumferentially positioned around the end caps 118b, although alternatives are possible. Each of the latches 192 have a fixed or base end 198 and a free end 200. The free end 200 of the latches 192 include a hook member 202.

The connector body 110b includes a flange 204 that extends circumferentially about the connector body 110b at first and second ends 120b, 122b. The flange 204 defines a connector body channel 206 (e.g., groove or other recessed area) that includes an inner surface 208. When the end caps 118b are mounted at the first and second ends 120b, 122b of the connector body 110b, the resilient latches 192 are configured to elastically flex over the flange 204 of the connector body 110b. When the hook member 202 has passed over the flange 204, the hook member 202 of the resilient latches 192 are configured to snap into the connector body channel 206 such that the hook member 202 engages the inner surface 208 of the connector body channel 206. The hook member 202 is captured within the connector body channel 206 by the flange 204. The flange 204 may be received in a top portion 210 of the latch cutout 194 of the end caps 118b to provide a snap-fit coupling.

Another embodiment of a connector assembly or pipe fitting 300 is shown in FIGS. 14-20. Connector assembly 300 is substantially similar to connector assembly 100 shown in FIGS. 1-13. The disclosure of connector assembly 100 is similar to connector assembly 300 and one of skill in the art would recognize that features of assemblies 100, 300 can be interchangeable or combined with one another. Differences between assemblies 100, 300 are discussed below and shown in FIGS. 14-20.

Figure 14:
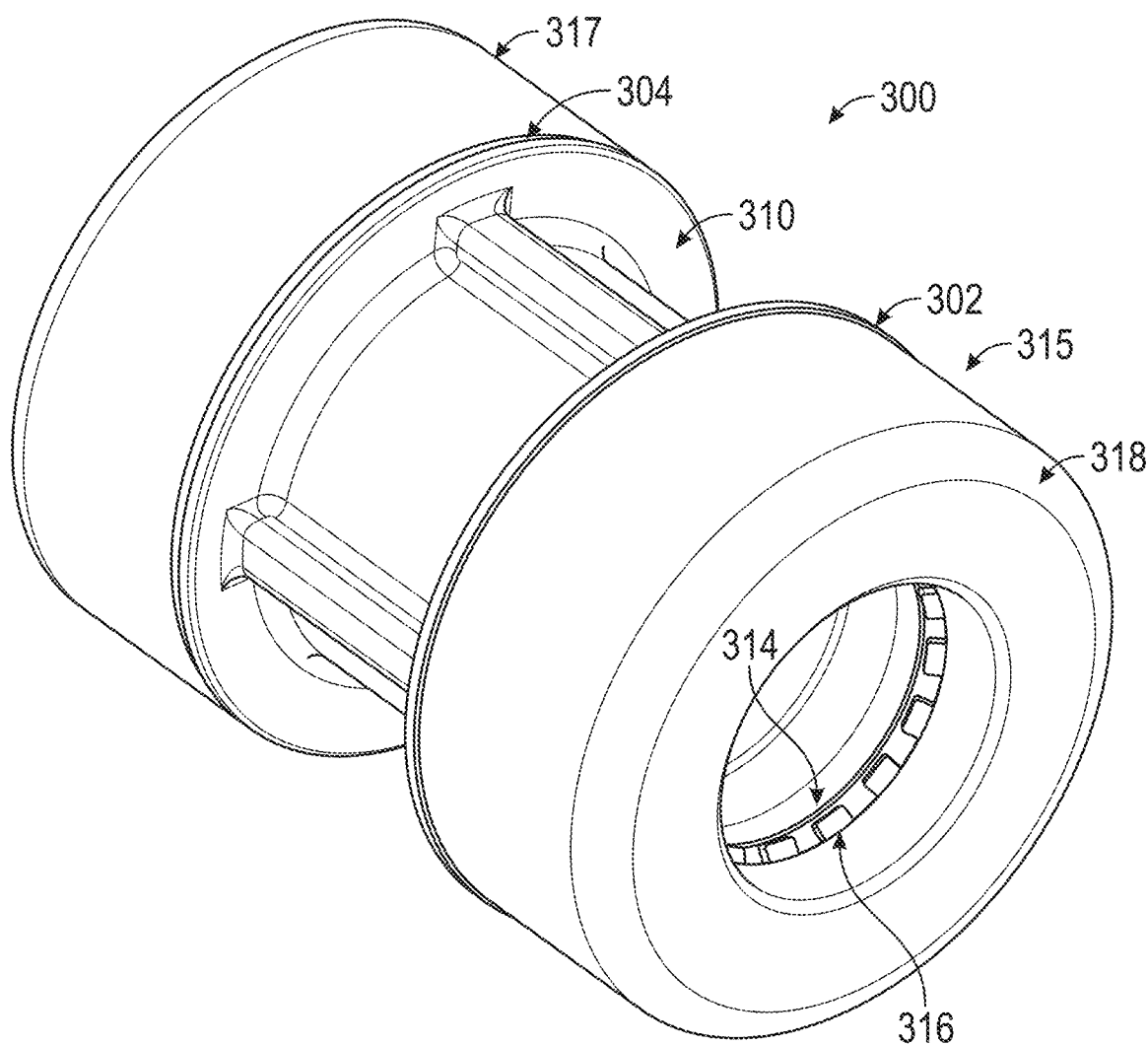
FIG. 14 is a perspective view of another connector assembly.
Figure 15:
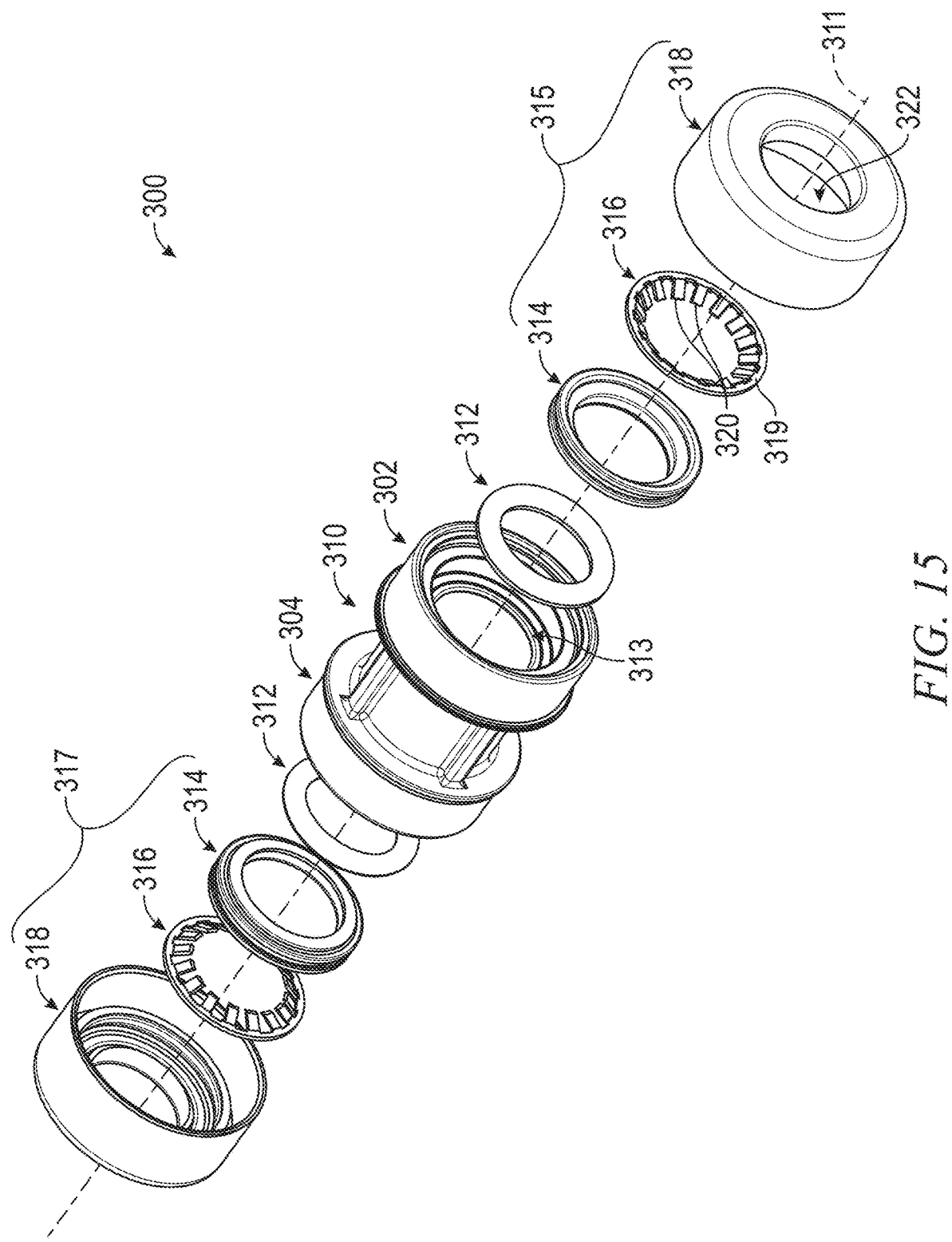
FIG. 15 is an exploded assembly view of the connector assembly of FIG. 14.
Figure 16:
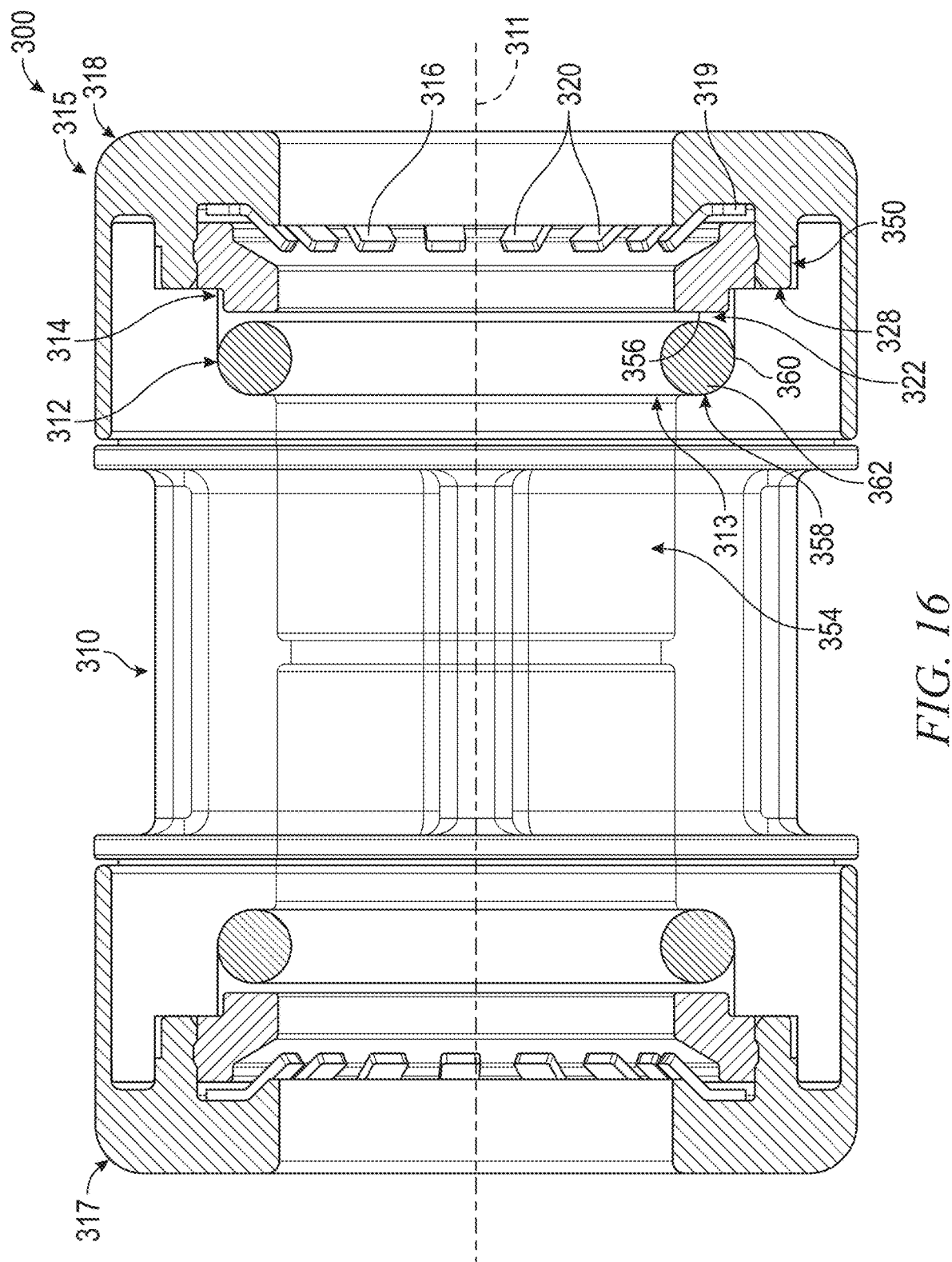
FIG. 16 is a cross section of the connector assembly of FIG. 14.

Connector assembly 300 includes a connector body 310 and at least one cap assembly 315 coupled to an end of the connector body 310 as shown in FIG. 14. In the illustrated embodiment, the connector assembly 300 includes a pair of cap assemblies 315, 317 coupled to opposite ends 302, 304 of the connector body 310. Other embodiments may include only one cap assembly 315 or more than two cap assemblies coupled to respective arms or ends of the connector body 310. The connector assembly 300 further includes a corresponding seal, gasket, or O-ring 312 (see FIG. 15) for each cap assembly 315, 317. The O-ring 312 may seal against conduits extending through the cap assemblies 315, 317.

The connector body 310 is made from a plastic material and can be transparent, although alternatives are possible. Each cap assembly 315, 317 includes a non-transparent cap 318 that may be attached to a connector body that provides an area or zone of insertion as discussed in the previous embodiments. Each cap assembly 315, 317 includes an end cap 318, a grab ring 316, and a protection ring 314. The grab ring 316 and the protection ring 314 are integrated with the end cap 318 to form a single assembly. That is, the grab ring 316 and the protection ring 314 may be formed as one piece with the end cap 318. The end cap 318 can be subsequently attached to the connector body 310 to complete the connector assembly 300. The cap assemblies 315, 317 of the illustrated embodiment are identical, as such, only the cap assembly 315 will be discussed in detail below.

The grab ring 316 includes a body 319 and a plurality of projections or teeth 320 configured to engage the external surface of a pipe inserted into the connector assembly 300. The grab ring 316 is received within a recess or interior 322 defined within the end cap 318. The end cap 318 includes a surface or plurality of surfaces 324, 326 that are generally complimentary to the grab ring 316. The plurality of surfaces 324, 326 can include an angled or otherwise ramped surface 326 that can restrict movement of the teeth 320 of the grab ring 316 along the axial direction. In this regard, the angled surface 326 can support or reinforce the grab ring 316 along the axial direction to help to prevent or restrict detachment of an inserted pipe.

The end cap 318 may further include a flange or projecting portion 328 that extends along the axial direction of the grab ring 316 and at least partially defining the recess 322. The flange or projecting portion 328 defines an opening 330 in the end cap 318 that is generally circular and sized to allow receipt of the grab ring 316 (i.e. has a greater diameter or outermost dimension than the grab ring 316).

Figure 17:
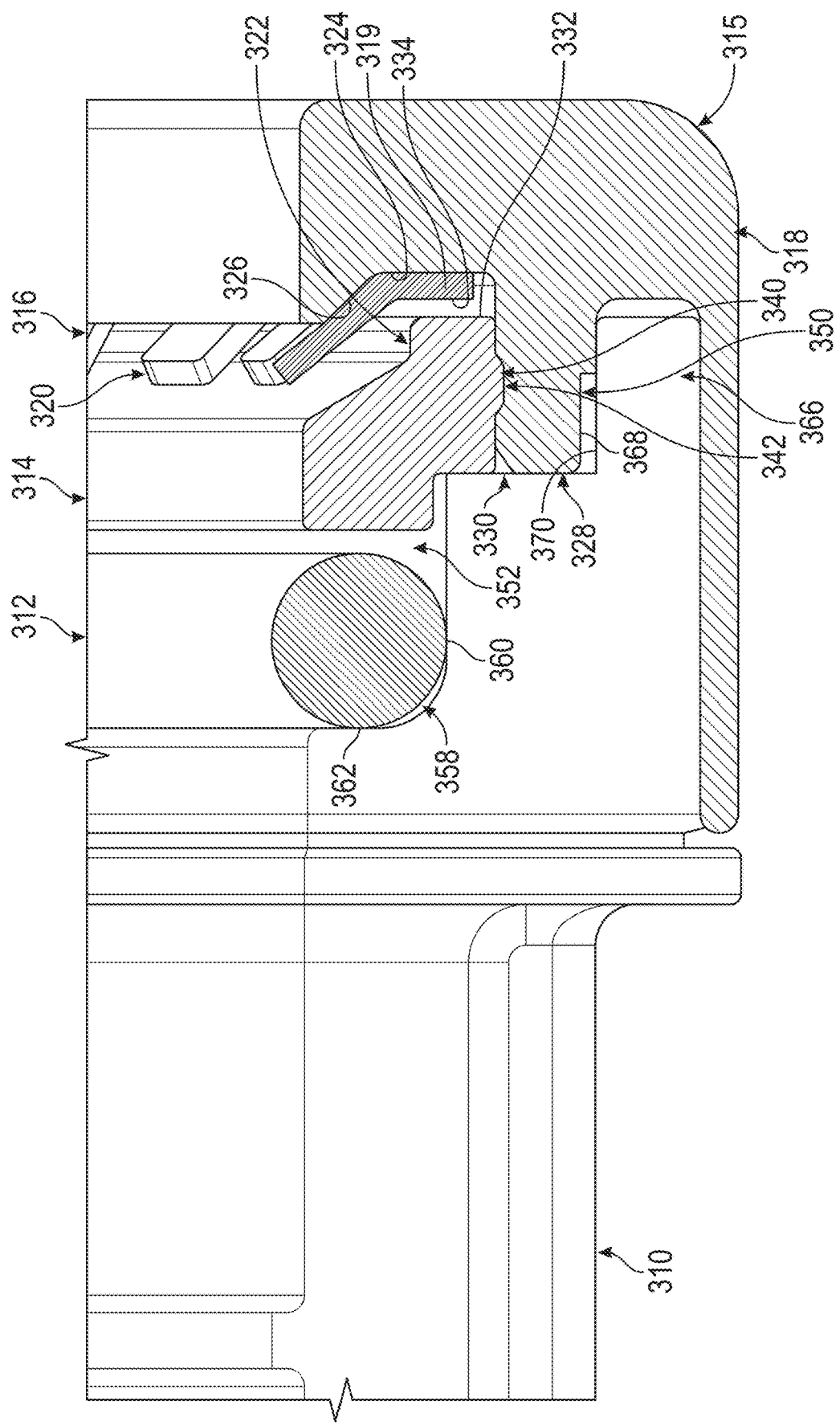
FIG. 17 is an enlarged view of a portion of FIG. 16.
Figure 19:
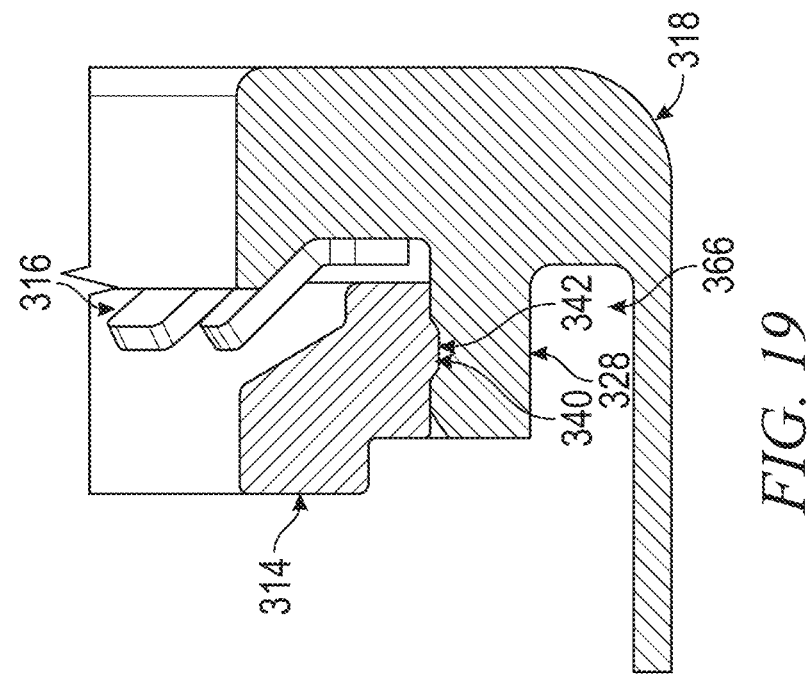
FIG. 19 is an enlarged view of a portion of FIG. 18.
Figure 18:
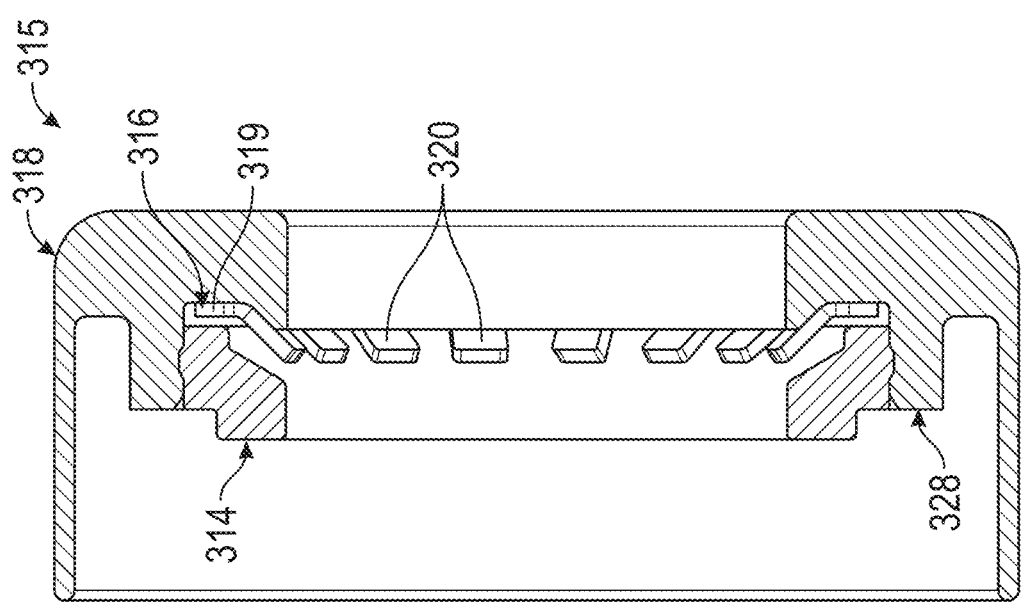
FIG. 18 is a cross section of a cap assembly included in the connector assembly of FIG. 14.

The protection ring 314 can be fitted or otherwise received within the opening 330 defined by the flange 328 as shown in FIGS. 17-19. In this regard, the protection ring 314 can be housed (e.g., by friction or an interlocking relationship) within the opening 330 and fixed therein to the end cap 318. With the protection ring 314 secured within the opening 330, the grab ring 316 is also secured to the end cap 318. That is, the protection ring 314 can block or inhibit movement of the grab ring 316 along the axial direction of the cap assembly 315 (i.e. along a central axis 311 of the cap assembly 315). The grab ring 316 therefore is secured between the surfaces 324, 326 of the end cap 318 and the protection ring 314. The protection ring 314 can include a surface 332 that is configured to engage a surface 334 of the body 319 of the grab ring 316, e.g., to inhibit movement of the grab ring 316 along the axial direction.

The protection ring 314 can include a tab or protuberance 340 along a surface thereof that can be fitted or otherwise received within a corresponding recess or notch 342 defined in a surface of the flange 328 as shown in FIGS. 17-19. In this regard, the protection ring 314 can be snap-fitted with the flange 328 and within the opening 330 such that the tab 340 is received within the recess 342 to secure the protection ring 314 and the grab ring 316 to the end cap 318. The tab or protuberance 340 may extend annularly around the central axis 311 of the cap assembly 315, or one or more tabs or protuberances 340 can extend only partway around the central axis 311 and be spaced apart circumferentially from one another. In additional or alternative embodiments, the flange 328 can include the tab 340 and the protection ring 314 can include the recess 342. It will be appreciated that other connection mechanisms or configurations are possible without departing from the scope of the present disclosure. For example, a plurality of tabs and a corresponding groove or grooves on either the cap or the protection ring is possible.

Another aspect of the present disclosure relates to a method of forming the cap assembly 315. In one example, the method may include inserting the grab ring 316 into the recess 330 at least partially defined by the flange 328 of the end cap 318, such that the grab ring 316 abuts one or more surfaces 324, 326 of the end cap 318. The method may include inserting the protection ring 314 into the opening 330 defined by the flange 328 until the tab 340 is received and secured within the corresponding groove 342 to attach the protection ring 314 to the cap, thereby securing the grab ring 316 between the protection ring 314 and the end cap 318 and forming the cap assembly 315. This can be done prior to or during attachment of the end cap 318 to the connector body 310.

FIGS. 16-19 show cross-sectional views of the connector assembly 300 or portions thereof. As shown, the cap assembly 315 can be connected to an end 302 of the connector body 310 by any suitable method or means. The cap assembly 315 can be at least partially received within one or more cavities or recesses 313 defined in the connector body 310 and adhered thereto by ultra-sonic welding or other adherence mechanism(s), such as via an adhesive, mechanical connection (e.g., friction fit or snap connection), chemical bonding, heat staking, etc.

Figure 20:
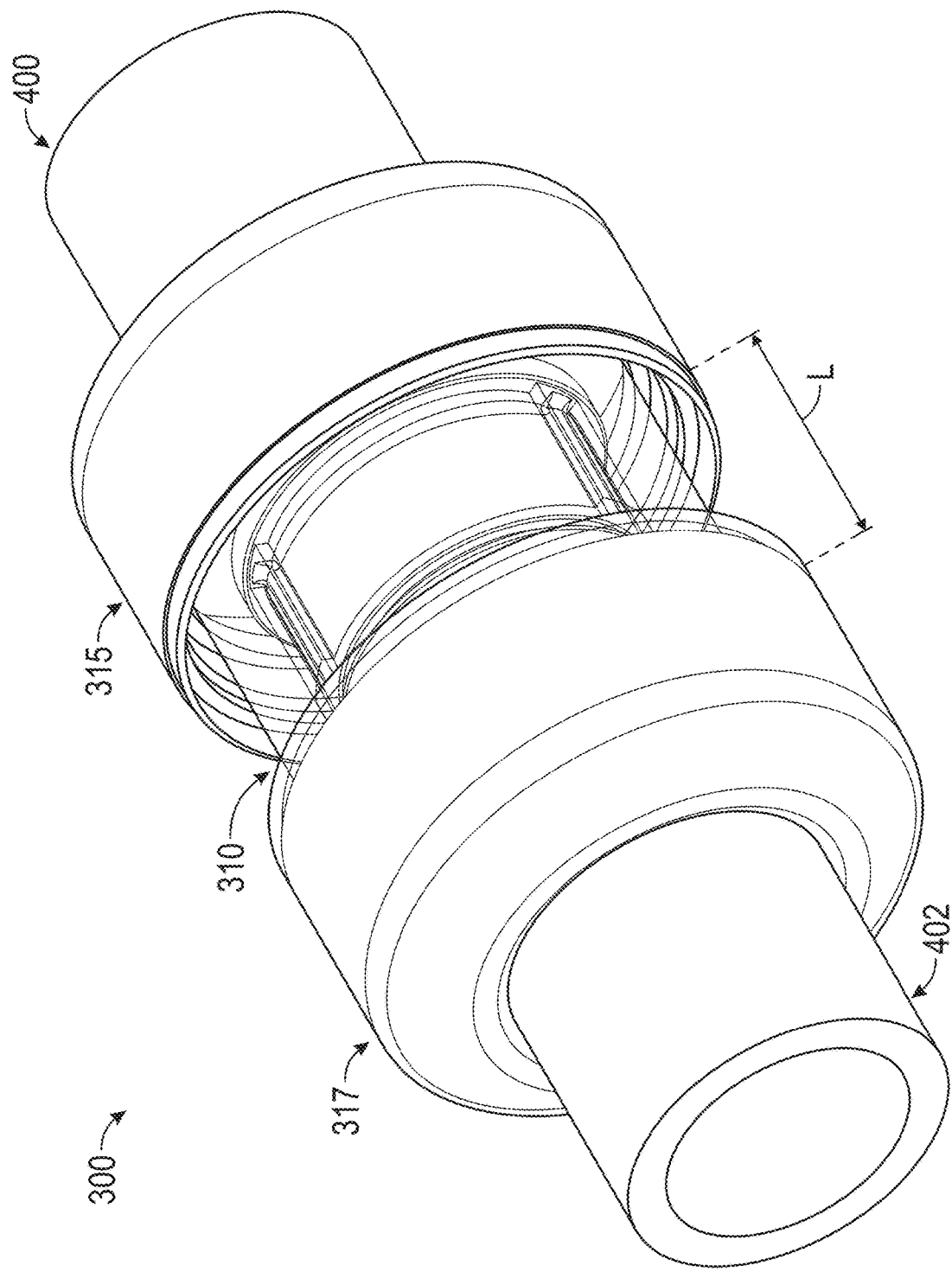
FIG. 20 is a perspective view of the connector assembly of FIG. 14 with conduits attached thereto.
Figure 21:
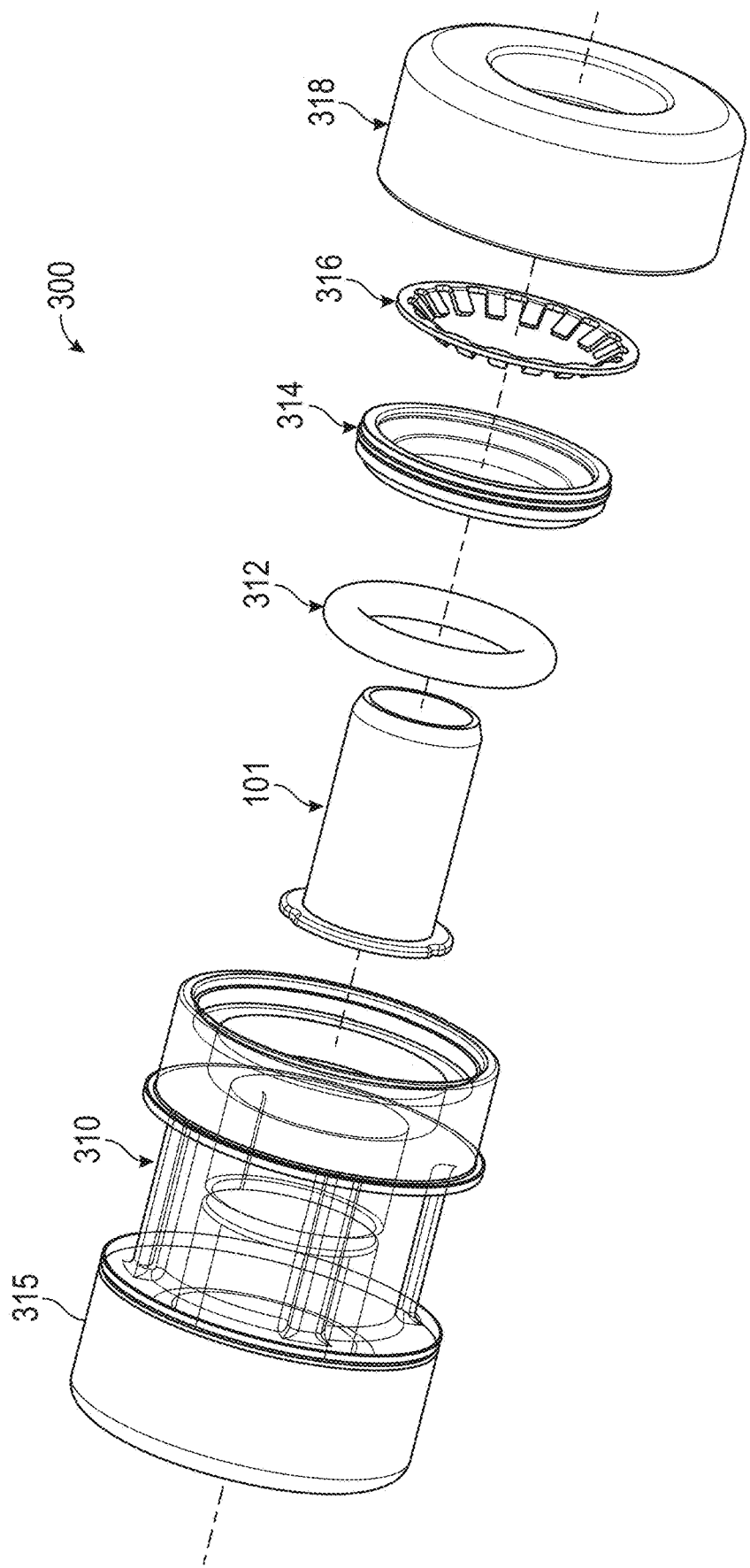
FIG. 21 is an exploded assembly view of the connector assembly of FIG. 14 showing a tube liner.

In the illustrated embodiment, the flange 328 of the end cap 318 is received within a first cavity 350 of the connector body 310, and at least a portion of the protection ring 314 is received within a second cavity 352 of the connector body 310 as shown in FIGS. 16-19. The second cavity 352 is in communication with the first cavity and is smaller (i.e. has a smaller diameter or outermost dimension) than the first cavity 350. The first and second cavities 350, 352 are also in communication with or at least partially define a passage 354 through the connector body 310. The passage 354 is configured to receive one or more pipes or conduits 400, 402 for connection thereto as shown in FIG. 20.

The seal 312, e.g., O-ring, is received within the second cavity 352 and can be held in place by the protection ring 314. In this regard, the protection ring 314 includes a surface 356 that partially defines a chamber 358 with portions of the connector body 310 for housing the seal 312. The chamber 358 also is partially defined by surfaces or shoulders 360, 362 of the connector body 310 defining or abutting the cavity 352.

The flange 328 defines a cavity or recess 366 (opposing the opening 350 for receiving the protection ring 314) that this configured to receive an end portion 302 of the connector body 310. A surface 368 of the flange 328 abutting or adjacent a surface 370 of the end portion 302 of the connector body 310 can include one or more stepped portions. However, this surface 366 can be generally flat (without step portions) according to embodiments of the present disclosure. At least a portion of the surface 368 abuts/contacts the surface 370 of the connector body 310 (e.g., a surface of the connector body at least partially defining its first cavity 350).

In certain examples, the surfaces 368 and 370 can be joined together by ultrasonic welding (as described in the other embodiments) or other adherence mechanism(s), such as via an adhesive, mechanical connection (e.g., friction fit or snap connection), chemical bonding, heat staking, etc. to form a connection joint therebetween. In addition or in the alternative, surfaces of the protection ring 314 and the flange 328 may be joined together by ultrasonic welding or other adherence mechanism, such as via an adhesive, mechanical connection (e.g., friction fit or snap connection), chemical bonding, heat staking, etc. to form a connection joint therebetween. In the illustrated embodiment, the connection joint includes a step joint, though other joints are possible, without departing from the scope of the present disclosure, such as a butt joint, a shear joint, a tongue and groove joint, or other suitable joint without departing from the scope of the present disclosure.

The method for forming the connection assembly 300 can include inserting the seal 312 into the second cavity 352 of the connector body 310. Then, the method can include inserting the cap assembly 315 into the first cavity 350 such that at least a portion of the protection ring 314 extends into the second cavity 352. And, the method can include adhering the cap assembly 315 to the connector body 310. In certain embodiments, adhering includes ultrasonically welding surfaces of the end cap 318 and connector body 310, although alternatives are possible.

Example Aspects of the Disclosure

Aspect 1. A connector assembly comprising: a connector body having a first end that defines a first opening and an opposite second end that defines a second opening, the connector body defining a fluid passage that extends through the first and second ends, the connector body including at least a portion having a plastic construction that is light transmissive, wherein the portion of the connector body including the plastic construction that is light transmissive at least partially defines a visible indication zone.

Aspect 2. The connector assembly of aspect 1, any other suitable aspect, or any suitable combination of aspects, further including a first sealing member configured to be inserted into the first opening of the connector body to form a sealing engagement with a first fluid conduit, and a second sealing member configured to be inserted into the second opening of the connector body to form a sealing engagement with a second fluid conduit.

Aspect 3. The connector assembly of aspect 2, any other suitable aspect, or any suitable combination of aspects, further including a first grab ring comprising a plurality of teeth configured for coupling to the first fluid conduit, and a second grab ring comprising a plurality of teeth configured for coupling to the second fluid conduit.

Aspect 4. The connector assembly of aspect 3, any other suitable aspect, or any suitable combination of aspects, further including a first protection ring partially positioned within the connector body at the first end thereof between the first grab ring and the first sealing ring, a second protection ring partially positioned within the connector body at the second end thereof between the second grab ring and the second sealing ring.

Aspect 5. The connector assembly of aspect 4, any other suitable aspect, or any suitable combination of aspects, further including a first end cap configured to mount on the connector body at the first end thereof, and a second end cap configured to mount on the connector body at the second end thereof.

Aspect 6. The connector assembly of aspect 5, any other suitable aspect, or any suitable combination of aspects, wherein the visible indication zone provides visual indication of two positions of the first and second fluid conduits inside the connector body, wherein a first position of the first and second fluid conduits includes a position where the first and second fluid conduits are respectively inserted beyond a seal portion of the connector body but not fully inserted to a predetermined depth defined by a conduit stop within the connector body, and wherein a second position of the first and second conduits includes a position where the first and second conduits are sealed and fully inserted within the connector body to the predetermined depth.

Aspect 7. The connector assembly of aspect 6, any other suitable aspect, or any suitable combination of aspects, further comprising first and second demount rings movable within the first and second cap openings of the first and second end caps, respectively, and configured to engage the plurality of teeth of the first and second grab rings to facilitate decoupling of the plurality of teeth from the first and second fluid conduits, respectively.

Aspect 8. The connector assembly of aspect 7, any other suitable aspect, or any suitable combination of aspects, wherein the first and second protection rings each include an inclined surface tapering to a smaller diameter as the inclined surface extends away from the first and second grab rings, respectively.

Aspect 9. The connector assembly of aspect 6, any other suitable aspect, or any suitable combination of aspects, wherein the first and second end caps are ultrasonically welded to the connector body.

Aspect 10. The connector assembly of aspect 5, any other suitable aspect, or any suitable combination of aspects, wherein the first and second end caps each include a plurality of latches in a sidewall of the first and second end caps, the plurality of latches being configured to secure the first and second end caps to the connector body at the first and second ends, respectively.

Aspect 11. The connector assembly of aspect 10, any other suitable aspect, or any suitable combination of aspects, wherein the connector body further defines a channel at the first and second ends that extend circumferentially thereabout, and wherein the plurality of latches of the first and second end caps are configured to engage the channel at the respective first and second ends when the first and second end caps are coupled to the connector body.

Aspect 12. The connector assembly of aspect 6, any other suitable aspect, or any suitable combination of aspects, wherein the first and second sealing members provide an outer diameter seal with the first and second fluid conduits, respectively.

Aspect 13. The connector assembly of aspect 10, any other suitable aspect, or any suitable combination of aspects, wherein the plurality of latches are defined by latch cutouts in the sidewall of the first and second end caps.

Aspect 14. The connector assembly of aspect 6, any other suitable aspect, or any suitable combination of aspects, wherein the first end cap has an interior wall with a step configuration and a first support wall to support the first grab ring when the first end cap is attached to the connector body.

Aspect 15. The connector assembly of aspect 6, any other suitable aspect, or any suitable combination of aspects, wherein the second end cap has an interior wall with a step configuration and a second support wall to support the second grab ring when the second end cap is attached to the connector body.

Aspect 16. The connector assembly of aspect 6, any other suitable aspect, or any suitable combination of aspects, wherein the first end cap defines a first end cap opening for receiving the first fluid conduit, and wherein the second end cap defines a second end cap opening for receiving the second fluid conduit, wherein the first and second end cap openings are axially aligned with the first and second openings of the connector body.

Aspect 17. A push-to-connect fitting comprising: a connector body having a first end that defines a first opening and an opposite second end that defines a second opening, the connector body defining a fluid passage that extends through the first and second ends, the connector body configured to receive a fluid conduit and having an end stop;

Aspect 18. The connector assembly of aspect 17, any other suitable aspect, or any suitable combination of aspects, wherein the connector body has a light transmissive portion with a plastic construction.

Aspect 19. The connector assembly of aspect 18, any other suitable aspect, or any suitable combination of aspects, further including a sealing member configured to provide an outer diameter seal with the fluid conduit.

Aspect 20. The connector assembly of aspect 19, any other suitable aspect, or any suitable combination of aspects, further including a grab ring comprising a plurality of teeth configured for coupling to the fluid conduit.

Aspect 21. The connector assembly of aspect 20, any other suitable aspect, or any suitable combination of aspects, further including a protection ring partially positioned within the connector body between the grab ring and the sealing ring.

Aspect 22. The connector assembly of aspect 21, any other suitable aspect, or any suitable combination of aspects, further including an end cap configured to mount on the connector body, the end cap having an interior wall with a step configuration and a support wall configured to support the grab ring when the end cap is attached to the connector body.

Aspect 23. The connector assembly of aspect 22, any other suitable aspect, or any suitable combination of aspects, further including an indication zone at least partially defined by the light transmissive portion of the connector body, the indication zone providing indication of two positions of the fluid conduit including a first position wherein the fluid conduit is partially inserted and sealed by the sealing member and a second position wherein the fluid conduit is fully inserted to engage the end stop.

Aspect 24. The connector assembly of aspect 23, any other suitable aspect, or any suitable combination of aspects, wherein the end cap defines an end cap opening for receiving the fluid conduit, wherein the end cap opening of the end cap is axially aligned with the first and second openings of the connector body.

Aspect 24. The connector assembly of aspect 22, any other suitable aspect, or any suitable combination of aspects, further comprising a demount ring movable within end cap opening of the end cap and configured to engage the plurality of teeth of the grab ring to facilitate decoupling of the plurality of teeth from the fluid conduit.

Aspect 25. The connector assembly of aspect 22, any other suitable aspect, or any suitable combination of aspects, wherein the protection ring includes an inclined surface tapering to a smaller diameter as the inclined surface extends away from the grab ring.

Aspect 26. The connector assembly of aspect 22, any other suitable aspect, or any suitable combination of aspects, wherein the end cap is ultrasonically welded to the connector body.

Aspect 27. The connector assembly of aspect 22, any other suitable aspect, or any suitable combination of aspects, wherein the end cap includes a plurality of latches in a sidewall of the end cap, the plurality of latches being configured to secure the end cap to the connector body.

Aspect 28. The connector assembly of aspect 27, any other suitable aspect, or any suitable combination of aspects, wherein the connector body further defines a channel that extends circumferentially thereabout, and wherein the plurality of latches of the end cap is configured to engage the channel when the end cap is coupled to the connector body.

Aspect 29. The connector assembly of aspect 27, any other suitable aspect, or any suitable combination of aspects, wherein the plurality of latches are defined by latch cutouts in the sidewall of the end cap.

Aspect 30. The connector assembly of aspect 22, any other suitable aspect, or any suitable combination of aspects, further comprising a tube liner configured to be inserted within the fluid conduit to limit light infiltration.

Aspect 31. The connector assembly of aspect 22, any other suitable aspect, or any suitable combination of aspects, further comprising a c-ring clamp configured to be mounted over a portion of the connector body to limit light infiltration.

Aspect 32. A method of assembling a connection fitting, the method comprising: a step of obtaining a connector body that defines a channel that extends therethrough, the connector body being configured to receive a conduit and having an end stop;

Aspect 33. The connector assembly of aspect 32, any other suitable aspect, or any suitable combination of aspects, including a step of positioning an o-ring sealing member in the channel of the connector body;

Aspect 34. The connector assembly of aspect 33, any other suitable aspect, or any suitable combination of aspects, including a step of positioning a protection ring adjacent an end of the connector body; and Aspect 35. The connector assembly of aspect 34, any other suitable aspect, or any suitable combination of aspects, including a step of positioning a grab ring adjacent the projecting ring such that the protection ring is partially positioned within the connector body between the grab ring and the sealing ring;

Aspect 36. The connector assembly of aspect 35, any other suitable aspect, or any suitable combination of aspects, including a step of positioning an end cap on the connector body, the grab ring being retained with the assistance of the end cap, the grab ring being configured to grip an outer surface of the conduit;

Aspect 37. The connector assembly of aspect 36, any other suitable aspect, or any suitable combination of aspects, wherein the connector body has a light transmissive portion with a plastic construction, the connector body including an indication zone at least partially defined by the light transmissive portion of the connector body, the indication zone providing indication of two positions of the conduit including a first position wherein the conduit is partially inserted and sealed by the o-ring sealing member and a second position wherein the conduit is fully inserted to engage the end stop.

Aspect 38. The connector assembly of aspect 37, any other suitable aspect, or any suitable combination of aspects, wherein the conduit is removably configured to be inserted into the channel of the connector body.

Aspect 39. The connector assembly of aspect 37, any other suitable aspect, or any suitable combination of aspects, wherein the two positions of the conduit are viewable by a naked eye.

Aspect 40. A connector assembly comprising: a connector body having a first end that defines a first opening and an opposite second end that defines a second opening, the connector body defining a fluid passage that extends through the first and second ends; and a first sealing member configured to be inserted into the first opening of the connector body to form a sealing engagement with a first fluid conduit, and a second sealing member configured to be inserted into the second opening of the connector body to form a sealing engagement with a second fluid conduit.

Aspect 41. The connector assembly of aspect 40, any other suitable aspect, or any suitable combination of aspects, including a first cap assembly including a first grab ring comprising a plurality of teeth configured for coupling to the first fluid conduit, a first protection ring partially positioned within the connector body at the first end thereof between the first grab ring and the first sealing ring, and a first end cap configured to mount on the connector body at the first end thereof.

Aspect 42. The connector assembly of aspect 41, any other suitable aspect, or any suitable combination of aspects, a second cap assembly including a second grab ring comprising a plurality of teeth configured for coupling to the second fluid conduit; a second protection ring partially positioned within the connector body at the second end thereof between the second grab ring and the second sealing ring; and a second end cap configured to mount on the connector body at the second end thereof.

Aspect 43. The connector assembly of aspect 42, any other suitable aspect, or any suitable combination of aspects, wherein the first protection ring is mounted to the first end cap with a friction or snap fit and is configured to clamp the first grab ring to the first end cap between the first protection ring and the first end cap prior to attachment of the first cap assembly with the first end of the connector body, and wherein the second protection ring is mounted to the second end cap with a friction or snap fit and is configured to clamp the second grab ring to the second end cap between the second protection ring and the second end cap prior to attachment of the second cap assembly with the second end of the connector body.

Aspect 44. The connector assembly of aspect 43, any other suitable aspect, or any suitable combination of aspects, wherein the connector body includes at least a portion having a plastic construction that is light transmissive, wherein the portion of the connector body including the plastic construction that is light transmissive at least partially defines a visible indication zone, and wherein the visible indication zone provides visual indication of two positions of the first and second fluid conduits inside the connector body, wherein a first position of the first and second fluid conduits includes a position where the first and second fluid conduits are respectively inserted beyond a seal portion of the connector body but not fully inserted to a predetermined depth defined by a conduit stop within the connector body, and wherein a second position of the first and second conduits includes a position where the first and second conduits are sealed and fully inserted within the connector body to the predetermined depth.

Aspect 45. The connector assembly of aspect 43, any other suitable aspect, or any suitable combination of aspects, wherein each protection ring includes a ring body and a protuberance that extends radially outward away from the ring body an toward a portion of each respective end cap, the retaining protuberance is configured to contact and retain each respective protection ring to each respective end cap.

Aspect 46. The connector assembly of aspect 45, any other suitable aspect, or any suitable combination of aspects, wherein the protuberance includes an annular ring extending around the ring body.

Aspect 47. The connector assembly of aspect 46, any other suitable aspect, or any suitable combination of aspects, wherein the protuberance includes at least one tab extending only partway around the ring body.

Aspect 48. The connector assembly of aspect 45, any other suitable aspect, or any suitable combination of aspects, wherein each end cap includes a flange configured to engage the protuberance and the flange is formed to include a notch that receives the protuberance when each respective protection ring is installed on each respective end cap.

Aspect 49. The connector assembly of aspect 48, any other suitable aspect, or any suitable combination of aspects, wherein the flange includes at least one stepped portion and a cavity is defined radially between a portion of the stepped portion of the flange and a portion of the connector pipe.

Aspect 50. The connector assembly of aspect 49, any other suitable aspect, or any suitable combination of aspects, wherein the stepped portion of the flange is ultrasonically welded to the connector body.

Aspect 51. A cap assembly configured to attach to a connector body of a pipe fitting, the cap assembly comprising: an end cap configured to mount on the connector body of the pipe fitting, the end cap defining a cap interior configured to receive a fluid conduit in a first direction.

Aspect 52. The connector assembly of aspect 51, any other suitable aspect, or any suitable combination of aspects, a grab ring positioned within the cap interior and comprising a plurality of teeth configured for coupling to the fluid conduit to block movement of the fluid conduit in a second direction opposite the first direction.

Aspect 53. The connector assembly of aspect 52, any other suitable aspect, or any suitable combination of aspects, a protection ring positioned within cap interior and configured to retain the grab ring within the cap interior.

Aspect 54. The connector assembly of aspect 53, any other suitable aspect, or any suitable combination of aspects, wherein the protection ring is mounted to the end cap with a friction or snap fit and is configured to clamp the grab ring to the end cap between the protection ring and the end cap prior to attachment of the cap assembly with the connector body.

Aspect 55. The connector assembly of aspect 54, any other suitable aspect, or any suitable combination of aspects, wherein each protection ring includes a ring body and a protuberance that extends radially outward away from the ring body an toward a portion of each respective end cap, the retaining protuberance is configured to contact and retain each respective protection ring to each respective end cap.

Aspect 56. The connector assembly of aspect 55, any other suitable aspect, or any suitable combination of aspects, wherein the protuberance includes an annular ring extending around the ring body.

Aspect 57. The connector assembly of aspect 56, any other suitable aspect, or any suitable combination of aspects, wherein the protuberance includes at least one tab extending only partway around the ring body.

Aspect 58. The connector assembly of aspect 54, any other suitable aspect, or any suitable combination of aspects, wherein the end cap includes a flange configured to engage the protuberance and the flange is formed to include a notch that receives the protuberance when the protection ring is installed on the end cap.

Aspect 59. The connector assembly of aspect 58, any other suitable aspect, or any suitable combination of aspects, wherein the flange includes at least one stepped portion and a cavity is defined radially between a portion of the stepped portion of the flange and a portion of the connector pipe.

Aspect 60. The connector assembly of aspect 59, any other suitable aspect, or any suitable combination of aspects, wherein the stepped portion of the flange is configured to be ultrasonically welded to the connector body.

From the forgoing detailed description, it will be evident that modifications and variations can be made without departing from the spirit and scope of the disclosure.

What is claimed is:

1. A connector assembly comprising:
a connector body having a first end that defines a first opening and an opposite second end that defines a second opening, the connector body defining first and second conduit stops between the first and second ends and a fluid passage that extends through the first and second ends, the connector body being entirely formed of a transparent material that extends from the first end to the second end, the transparent material being a plastic construction that is light transmissive;
a first O-ring sealing member configured to be inserted into the first opening of the connector body to form a sealing engagement with a first fluid conduit, and a second O-ring sealing member configured to be inserted into the second opening of the connector body to form a sealing engagement with a second fluid conduit;
a visible indication zone defined in a portion of the connector body, wherein the visible indication zone provides visual indication of two visual positions of the first and second fluid conduits inside the connector body, wherein a first visual position of the first and second fluid conduits includes a visual position where the first and second fluid conduits are respectively inserted beyond a seal portion of the connector body provided by the first and second O-ring sealing members but not fully inserted to a predetermined depth defined respectively by the first and second conduit stops within the connector body, and wherein a second visual position of the first and second conduits includes a visual position where the first and second conduits are sealed and fully inserted within the connector body to the predetermined depth respectively provided by the first and second conduit stops within the connector body;
a first grab ring comprising a plurality of teeth configured for coupling to the first fluid conduit, and a second grab ring comprising a plurality of teeth configured for coupling to the second fluid conduit;
a first protection ring partially positioned within the connector body at the first end thereof between the first grab ring and the first O-ring sealing member, a second protection ring partially positioned within the connector body at the second end thereof between the second grab ring and the second O-ring sealing member; and
a first end cap configured to mount on the connector body at the first end thereof, and a second end cap configured to mount on the connector body at the second end thereof;

wherein the connector assembly further comprises a tube liner.

2. The connector assembly of claim 1, wherein the connector body is made with a polyphenylsulfone (PPSU) material.

3. The connector assembly of claim 1, wherein the first and second grab rings are formed from stainless steel.

4. The connector assembly of claim 1, wherein the first and second end caps are configured to facilitate retention of the first and second O-ring sealing members, the first and second grab rings, and the first and second protection rings at the respective first and second ends of the connector body.

5. The connector assembly of claim 1, wherein the first and second end caps are opaque such that when the first and second end caps are mounted at the respective first and second ends of the connector body, portions of the transparent connector body are covered by the first and second end caps and only the visible indication zone is visible.

6. The connector assembly of claim 5, wherein the first and second fluid conduits are not visible through the first and second end caps.

7. The connector assembly of claim 1, further comprising first and second demount rings movable within first and second cap openings of the first and second end caps, respectively, and configured to engage the plurality of teeth of the first and second grab rings to facilitate decoupling of the plurality of teeth from the first and second fluid conduits, respectively.

8. The connector assembly of claim 1, wherein the first and second protection rings each include an inclined surface tapering to a smaller diameter as the inclined surface extends away from the first and second grab rings, respectively.

9. The connector assembly of claim 1, wherein the first and second end caps are ultrasonically welded to the connector body.

10. The connector assembly of claim 1, wherein the first and second O-ring sealing members provide an outer diameter seal with the first and second fluid conduits, respectively.

11. The connector assembly of claim 1, wherein the first and second end caps each include a plurality of latches in a sidewall of the first and second end caps, the plurality of latches being configured to secure the first and second end caps to the connector body at the first and second ends, respectively.

12. The connector assembly of claim 11, wherein the connector body further defines a channel at the respective first and second ends that extend circumferentially thereabout, and wherein the plurality of latches of the first and second end caps are configured to engage the channel at the respective first and second ends when the first and second end caps are coupled to the connector body.

13. The connector assembly of claim 11, wherein the plurality of latches are defined by latch cutouts in the sidewall of the first and second end caps.

14. The connector assembly of claim 1, wherein the first and second end caps each have an interior wall with a step configuration and a support wall to respectively support the first and second grab rings when the first and second end caps are respectively attached to the connector body.

15. The connector assembly of claim 1, wherein the first end cap defines a first end cap opening for receiving the first fluid conduit, wherein the second end cap defines a second end cap opening for receiving the second fluid conduit, and wherein, when the first and second end caps are mounted on the connector body, the first and second end cap openings are axially aligned with the first and second openings of the connector body.

16. A push-to-connect fitting comprising:
a connector body having a first end that defines a first opening and an opposite second end that defines a second opening, the connector body being configured to receive a fluid conduit, wherein the connector body defines a fluid conduit stop for the fluid conduit, the connector body being entirely formed of a transparent material that extends from the first end to the second end, the transparent material being a plastic construction that is light transmissive;
a sealing member configured to provide an outer diameter seal with the fluid conduit;
a grab ring comprising a plurality of teeth configured for coupling to the fluid conduit;
a protection ring partially positioned within the connector body between the grab ring and the sealing ring;
an indication zone defined in a portion of the light transmissive connector body, the indication zone providing indication of the fluid conduit in a first position where the fluid conduit is partially inserted into the connector body and sealed by the sealing member and a second position wherein the fluid conduit is fully inserted into the connector body and engaged with the fluid conduit stop; and
an end cap configured to mount on the connector body, wherein, when the end cap is mounted on the connector body and when the fluid conduit is received within the connector body, the fluid conduit is not visible through the end cap but is visible through the light 5 transmissive portion of the connector body;
wherein the push-to-connect fitting further comprises a tube liner.

17. The push-to-connect fitting of claim 16, wherein the end cap defines an end cap opening for receiving the fluid conduit, wherein the end cap opening of the end cap is axially aligned with the first and second openings of the connector body.

18. The push-to-connect fitting of claim 17, further comprising a demount ring movable within end cap opening of the end cap and configured to engage the plurality of teeth of the grab ring to facilitate decoupling of the plurality of teeth from the fluid conduit.

19. The push-to-connect fitting of claim 16, wherein the protection ring includes an inclined surface tapering to a smaller diameter as the inclined surface extends away from the grab ring.

20. The push-to-connect fitting of claim 16, wherein the end cap is ultrasonically welded to the connector body.

21. The push-to-connect fitting of claim 16, wherein the end cap includes a plurality of latches defined by latch cutouts in a sidewall of the end cap, the plurality of latches being configured to secure the end cap to the connector body.

22. The push-to-connect fitting of claim 21, wherein the connector body further defines a channel that extends circumferentially thereabout, and wherein the plurality of latches of the end cap is configured to engage the channel when the end cap is coupled to the connector body.

23. A method of assembling a connection fitting, the method comprising:
obtaining a connector body that has a first end that defines a first opening and an opposite second end that defines a second opening, wherein the connector body defines a channel that extends therethrough to receive a conduit and the connector body has an end stop for the conduit;

positioning the O-ring sealing member in the connector body;

positioning a protection ring in the connector body;

positioning a grab ring adjacent the projecting ring such that the protection ring is positioned within the connector body between the grab ring and the O-ring sealing member; and positioning an end cap on the connector body, the grab ring being retained with the assistance of the end cap, the grab ring being configured to grip an outer surface of the conduit;

wherein the connector body is entirely formed of a transparent material that extends from the first end to the second end, the transparent material being a plastic construction that is light transmissive, the connector body including an indication zone defined by the light transmissive connector body, the indication zone providing indication of two visual positions of the conduit including a first visual position where the conduit is partially inserted into the connector body and sealed by the O-ring sealing member and a second visual position where the conduit is fully inserted into the connector body to engage the end stop; and wherein the connection fitting further comprises a tube liner.

24. The method of claim 23, wherein the protection ring includes a ring body and a protuberance that extends radially outward away from the ring body and toward a portion of the end cap, the retaining protuberance is configured to contact and retain the protection ring to the end cap.

25. The method of claim 24, wherein the protuberance includes an annular ring extending around the ring body, and wherein the protuberance includes at least one tab extending only partway around the ring body.

26. The method of claim 24, wherein the end cap includes a flange configured to engage the protuberance and the flange is formed to include a notch that receives the protuberance when the protection ring is installed on the end cap.

27. The method of claim 26, wherein the flange includes at least one stepped portion and a cavity is defined radially between a portion of the stepped portion of the flange and a portion of the connector body.

28. The method of claim 27, wherein the at least one stepped portion of the flange is ultrasonically welded to the connector body.

29. A connector assembly comprising:

a connector body having a first end that defines a first opening and an opposite second end that defines a second opening, the connector body defining first and second conduit stops between the first and second ends and a fluid passage that extends through the first and second ends, the connector body being entirely formed of a transparent material that extends from the first end to the second end, the transparent material being a plastic construction that is light transmissive;

a first O-ring sealing member configured to be inserted into the first opening of the connector body to form a sealing engagement with a first fluid conduit, and a second O-ring sealing member configured to be inserted into the second opening of the connector body to form a sealing engagement with a second fluid conduit;

a visible indication zone defined in a portion of the connector body, wherein the visible indication zone provides visual indication of two visual positions of the first and second fluid conduits inside the connector body, wherein a first visual position of the first and second fluid conduits includes a visual position where the first and second fluid conduits are respectively inserted beyond a seal portion of the connector body provided by the first and second O-ring sealing members but not fully inserted to a predetermined depth defined respectively by the first and second conduit stops within the connector body, and wherein a second visual position of the first and second conduits includes a visual position where the first and second conduits are sealed and fully inserted within the connector body to the predetermined depth respectively provided by the first and second conduit stops within the connector body;

a first grab ring comprising a plurality of teeth configured for coupling to the first fluid conduit, and a second grab ring comprising a plurality of teeth configured for coupling to the second fluid conduit;

a first protection ring partially positioned within the connector body at the first end thereof between the first grab ring and the first O-ring sealing member, a second protection ring partially positioned within the connector body at the second end thereof between the second grab ring and the second O-ring sealing member; and a first end cap configured to mount on the connector body at the first end thereof, and a second end cap configured to mount on the connector body at the second end thereof;

wherein the first and second end caps each include latch cutouts that extend through a sidewall of the first and second end caps to define a plurality of latches, the plurality of latches being configured to secure the first and second end caps to the connector body at the first and second ends, respectively.

30. The connector assembly of claim 29, further comprising a tube liner to limit light infiltration.

\* \* \* \* \*